US012529979B2

(12) United States Patent
Ichimura et al.

(10) Patent No.: US 12,529,979 B2
(45) Date of Patent: Jan. 20, 2026

(54) IMAGE FORMING APPARATUS HAVING CONNECTOR FOR DETACHABLE PROCESS CARTRIDGE

(71) Applicant: CANON KABUSHIKI KAISHA, Tokyo (JP)

(72) Inventors: Hiroki Ichimura, Shizuoka (JP); Satoshi Koga, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/757,923

(22) Filed: Jun. 28, 2024

(65) Prior Publication Data

US 2025/0004394 A1 Jan. 2, 2025

(30) Foreign Application Priority Data

Jun. 29, 2023 (JP) ................................ 2023-106824

(51) Int. Cl.

| | |
|---|---|
| ***G03G 15/00*** | (2006.01) |
| ***G03G 15/08*** | (2006.01) |
| ***G03G 21/16*** | (2006.01) |
| ***G03G 21/18*** | (2006.01) |

(52) U.S. Cl.

CPC ......... *G03G 15/0865* (2013.01); *G03G 15/80* (2013.01); *G03G 21/1652* (2013.01); *G03G 21/1867* (2013.01); *G03G 2215/0617* (2013.01)

(58) Field of Classification Search

CPC ............... G03G 15/0865; G03G 15/80; G03G 21/1652; G03G 21/1867; G03G 2215/0617

See application file for complete search history.

(56) References Cited

U.S. PATENT DOCUMENTS

| | | | |
|---|---|---|---|
| 8,873,992 B2 | 10/2014 | Sasaki et al. | |
| 9,304,483 B2 | 4/2016 | Komatsu et al. | |
| 10,234,815 B2 * | 3/2019 | Nakayashiki | G03G 15/80 |
| 2020/0064772 A1 * | 2/2020 | Machii | G03G 21/1652 |

FOREIGN PATENT DOCUMENTS

| | | |
|---|---|---|
| JP | 2000181325 A * | 6/2000 |
| JP | 2008-257124 A | 10/2008 |
| JP | 2013-122579 A | 6/2013 |
| JP | 2014-106393 A | 6/2014 |
| JP | 2015-014632 A | 1/2015 |

* cited by examiner

*Primary Examiner* — Sophia S Chen
(74) *Attorney, Agent, or Firm* — Venable LLP

(57) ABSTRACT

A cartridge includes a pressing portion, a recessed portion, and an electrical contact. An apparatus body includes a contact unit that includes a contact and a protrusion. The contact and the protrusion are movable away from the mounting region against an elastic force. The contact unit is at a first position in a non-mounted state, a second position in a mounted state, and a third position in a middle state of transitioning from the non-mounted state to the mounted state. The second position is farther away from the mounting region than the first position by the protrusion being inserted into the recessed portion and the contact contacting with the electrical contact. The third position is farther away from the mounting region than the second position by the protrusion being pressed by the pressing portion so that the contact does not contact with the cartridge.

17 Claims, 39 Drawing Sheets

IMAGE FORMING APPARATUS HAVING CONNECTOR FOR DETACHABLE PROCESS CARTRIDGE

BACKGROUND OF THE INVENTION

Field of the Invention

The present invention relates to an image forming apparatus.

Description of the Related Art

In an image forming apparatus using an electrophotographic forming process, a configuration is known in which a process cartridge in which an electrophotographic photosensitive member (hereinafter, referred to as a photosensitive drum) and means for processing a photosensitive drum are integrally formed into a cartridge is detachably provided. In addition to the process cartridge, there is known a configuration in which various functional members constituting an image forming apparatus, such as a toner cartridge in which a toner container is formed into a cartridge, are used as cartridges detachable from an apparatus body. Such a cartridge is provided with a plurality of electrical contacts for being electrically connected to the apparatus body, and the apparatus body is provided with a contact that is in contact with the electrical contact of the cartridge and is electrically connected to the cartridge.

Japanese Patent Application Laid-open No. 2014-106393 discloses a configuration in which whether a contact of an apparatus body contacts with or separates from an electrical contact of a cartridge is interlocked with a door opening/closing operation. In this configuration, when the door is closed, the contact of the apparatus body contacts with the electrical contact of the cartridge, and when the door is opened, the contact of the apparatus body is away from the electrical contact of the cartridge, and the cartridge can be removed from the apparatus body.

In the configuration of Japanese Patent Application Laid-open No. 2014-106393, when the door is opened, the electrical contact of the cartridge and the contact of the apparatus body are separated from each other in conjunction with opening and closing of the door, so that the contact is not caught when the user performs an attaching and detaching operation of the cartridge, and thus operability is good. On the other hand, there are problems of an increase in the number of components, an increase in cost, and an increase in size of the apparatus due to the configuration for interlocking the contact/separation between the electrical contact and the contact with the opening/closing of the door.

SUMMARY OF THE INVENTION

The present invention suppresses interference between a cartridge and a contact of an apparatus body at the time of attaching and detaching the cartridge with a simple configuration.

The present invention is an image forming apparatus comprising:

- a cartridge; and
- an apparatus body to which the cartridge is detachably mounted in a first direction,
- wherein the cartridge includes:
  - a pressing portion provided on an end surface in a second direction intersecting the first direction and a gravity direction;
  - a recessed portion provided in the end surface and recessed more than the pressing portion;
  - a powered member; and
  - an electrical contact for receiving power to be supplied to the powered member,
- wherein the apparatus body includes:
  - a frame body having a mounting region where the cartridge is mounted; and
  - a contact unit provided in an end of the frame body in the second direction, the contact unit including a contact and a protrusion protruding toward the mounting region, the contact and the protrusion being movable in the second direction and in a direction away from the mounting region against an elastic force,
- the contact unit is located at:
  - a first position in a non-mounted state in which the cartridge is not mounted to the apparatus body;
  - a second position in a mounted state in which the cartridge is mounted to the apparatus body and is in the mounting region of the frame body, the second position being farther away from the mounting region than the first position in the second direction by the protrusion being inserted into the recessed portion and the contact contacting with the electrical contact; and
  - a third position in a middle state of transitioning of the cartridge from the non-mounted state to the mounted state, the third position being farther away from the mounting region than the second position in the second direction by the protrusion being pressed by the pressing portion of the cartridge so that the contact does not contact with the cartridge.

According to the present invention, it is possible to suppress interference between the cartridge and the contact of the apparatus body at the time of attaching and detaching the cartridge with a simple configuration.

Further features of the present invention will become apparent from the following description of exemplary embodiments with reference to the attached drawings.

DESCRIPTION OF THE EMBODIMENTS

First Example

Figure 1:
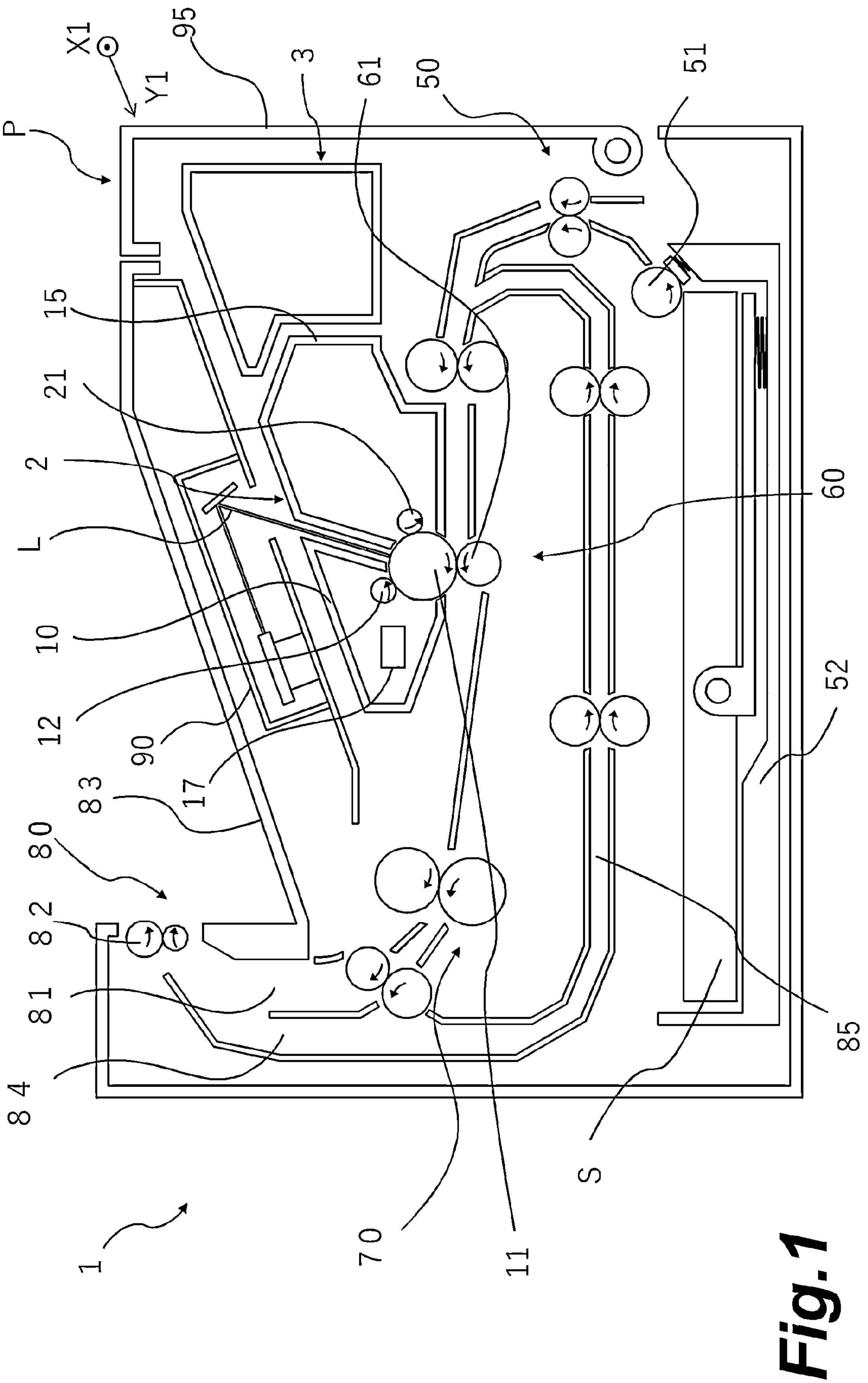
FIG. 1 is a cross-sectional view illustrating a schematic configuration of an image forming apparatus.

Hereinafter, applicable embodiments of the present invention will be described in detail with reference to the drawings. FIG. 1 is a cross-sectional view illustrating a schematic configuration of a monochrome laser printer as an example of an image forming apparatus. However, dimensions, materials, relative arrangements, and the like of the components described in the present embodiment are not limited to the scope of the present invention unless otherwise specified, and can be appropriately changed within the scope of the gist of the present invention.

As illustrated in FIG. 1, an apparatus body 1 of the image forming apparatus P includes a sheet feeding unit 50, a transfer portion 60, a fixing unit 70, a sheet discharge unit 80, and a laser scanner 90. The apparatus body 1 is a frame body provided with a mounting region where a process cartridge 2 and a toner cartridge 3 can be mounted, and the process cartridge 2 and the toner cartridge 3 are configured to be detachable. The mounting region is a region where the process cartridge 2 exists in a case where the process cartridge 2 is mounted to the apparatus body 1. The process cartridge 2 includes a powered member 17 that operates by being supplied with power from the apparatus body 1. A mounting direction of the process cartridge 2 with respect to the apparatus body 1 is Y1. A direction intersecting the Y1 direction and the gravity direction (vertical direction) (a direction perpendicular to the Y1 direction in the first example), that is, a width direction (width direction of the apparatus body 1 and rotation axis direction of a photosensitive drum 11) of a sheet S is X1. The X1 direction is a direction perpendicular to the paper surface of FIG. 1. A direction opposite to the Y1 direction (a direction in which the process cartridge 2 is removed) is defined as a Y2 direction, and a direction opposite to the X1 direction is defined as an X2 direction. The Y1 direction and the Y2 direction are referred to as a first direction, and the X1 direction and the X2 direction are referred to as a second direction.

Next, the operation of an image forming apparatus P will be described in detail. The photosensitive drum 11 rotationally driven by a driving source (not illustrated) is uniformly charged to a predetermined potential by a charging roller 12. The surface of the charged photosensitive drum 11 is exposed by laser light L on the basis of image information by the laser scanner 90, and the charge of the exposed portion is removed to form an electrostatic latent image. Toner is supplied from a developing roller 21 to the electrostatic latent image on the photosensitive drum 11 and visualized as a toner image.

In parallel with such an operation for forming a toner image, a feeding roller 51 rotates to separate and feed the uppermost sheet S in a sheet feeding cassette 52. The sheet S is conveyed to the transfer portion 60 formed by the photosensitive drum 11 and a transfer roller 61 in synchronization with the timing of the toner image formation of the photosensitive drum 11. When passing through the transfer portion 60, the toner image is transferred to the sheet S as an unfixed image by applying a bias to the transfer roller 61. Thereafter, the sheet S to which the toner image has been transferred is conveyed to the fixing unit 70. When the sheet S conveyed to the fixing unit 70 passes through the fixing unit 70, the unfixed image is heated and pressed to be fixed on the surface of the sheet S. In a case where an image is formed only on one surface of the sheet S, the sheet S is conveyed to a discharge path 81, and discharged and stacked on a discharge tray 83 by a pair of discharge rollers 82. In addition, in a case where images are formed on both surfaces of the sheet S, the sheet S is conveyed to re-conveyance paths 84 and 85, and is conveyed to the transfer portion 60 again in a state where the front and back surfaces are reversed.

Figure 2A:
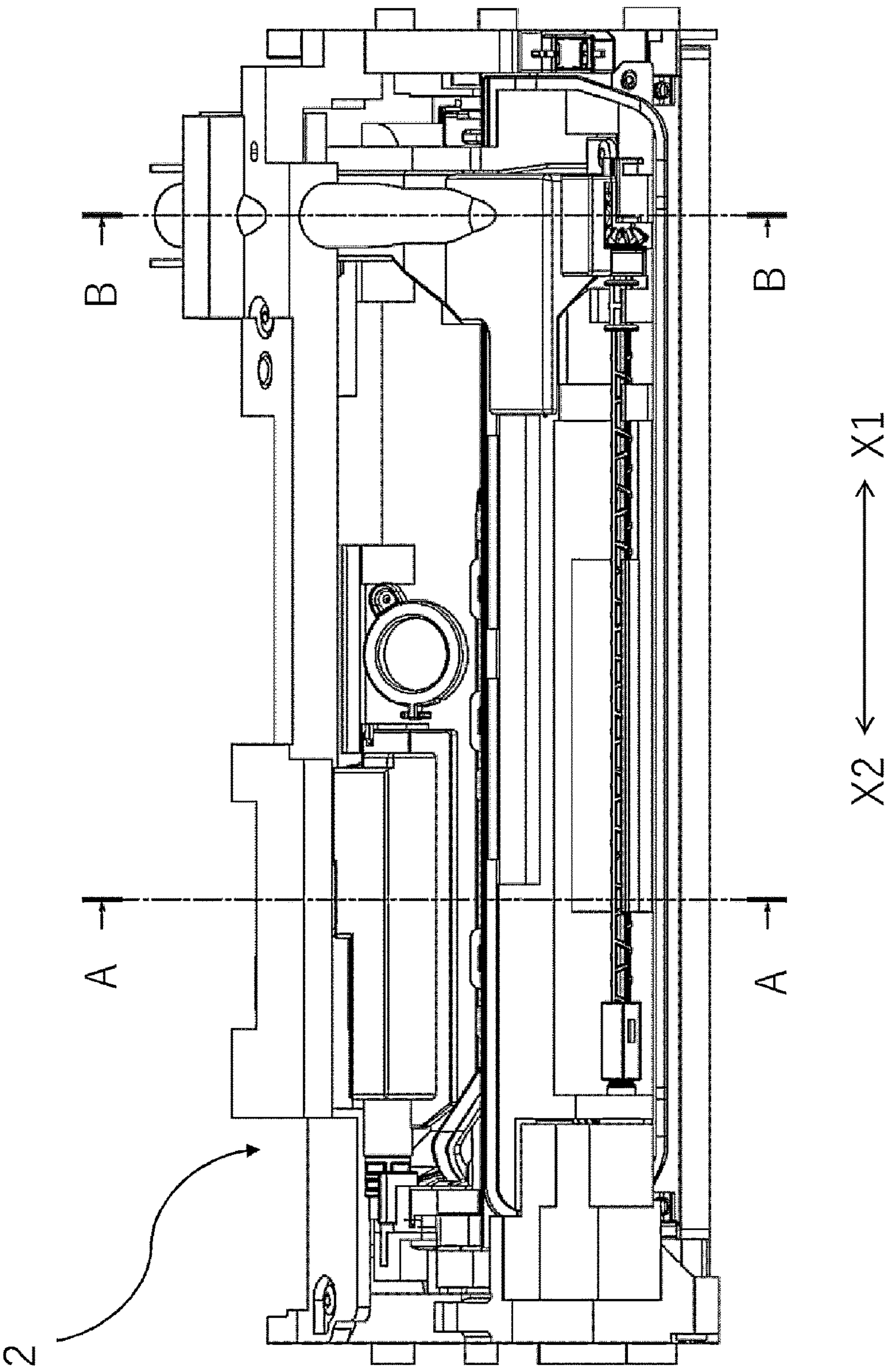
FIG. 2A is a front view illustrating a configuration of a process cartridge.
Figure 2B:
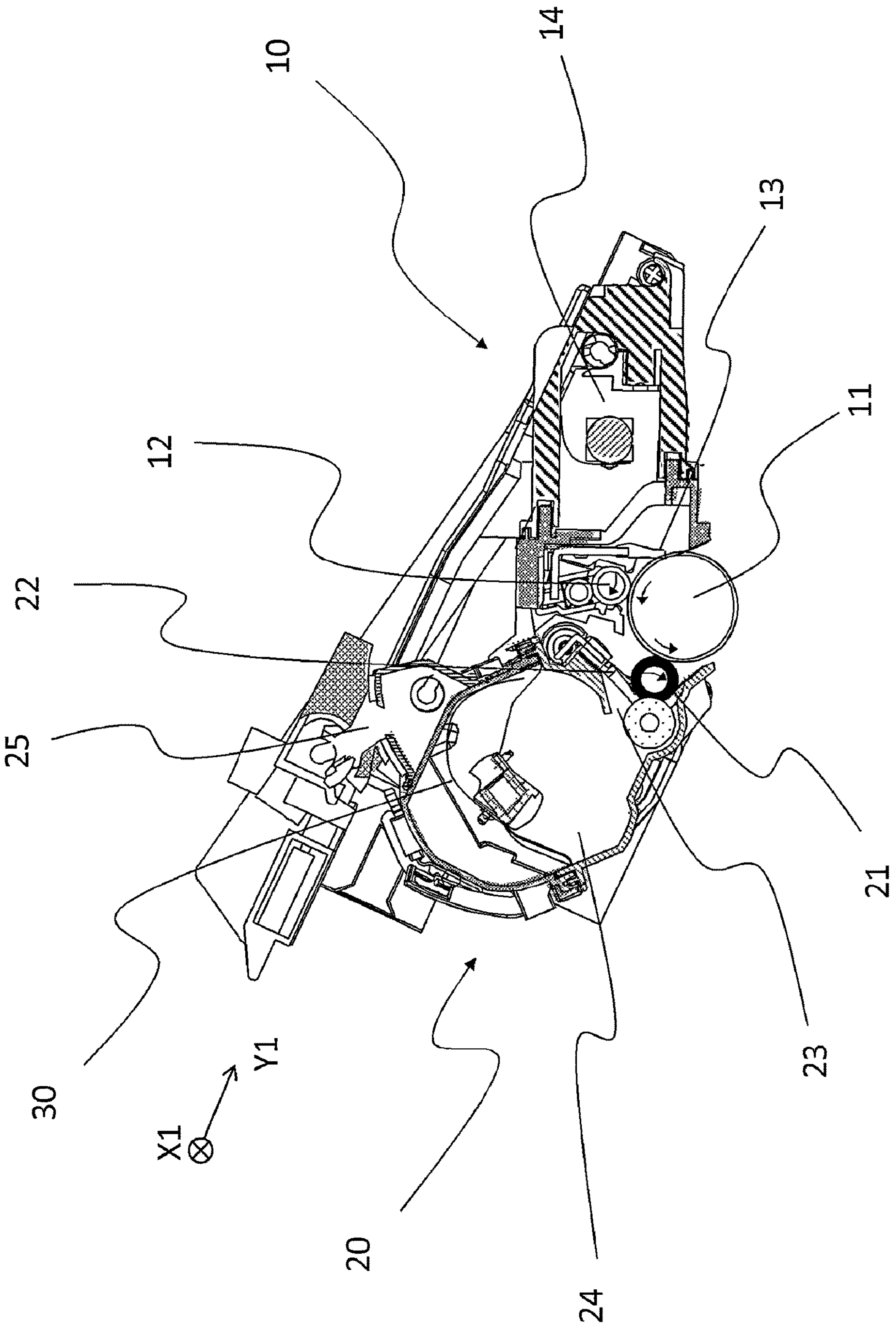
FIG. 2B is a cross-sectional view illustrating a configuration of the process cartridge.
Figure 2C:
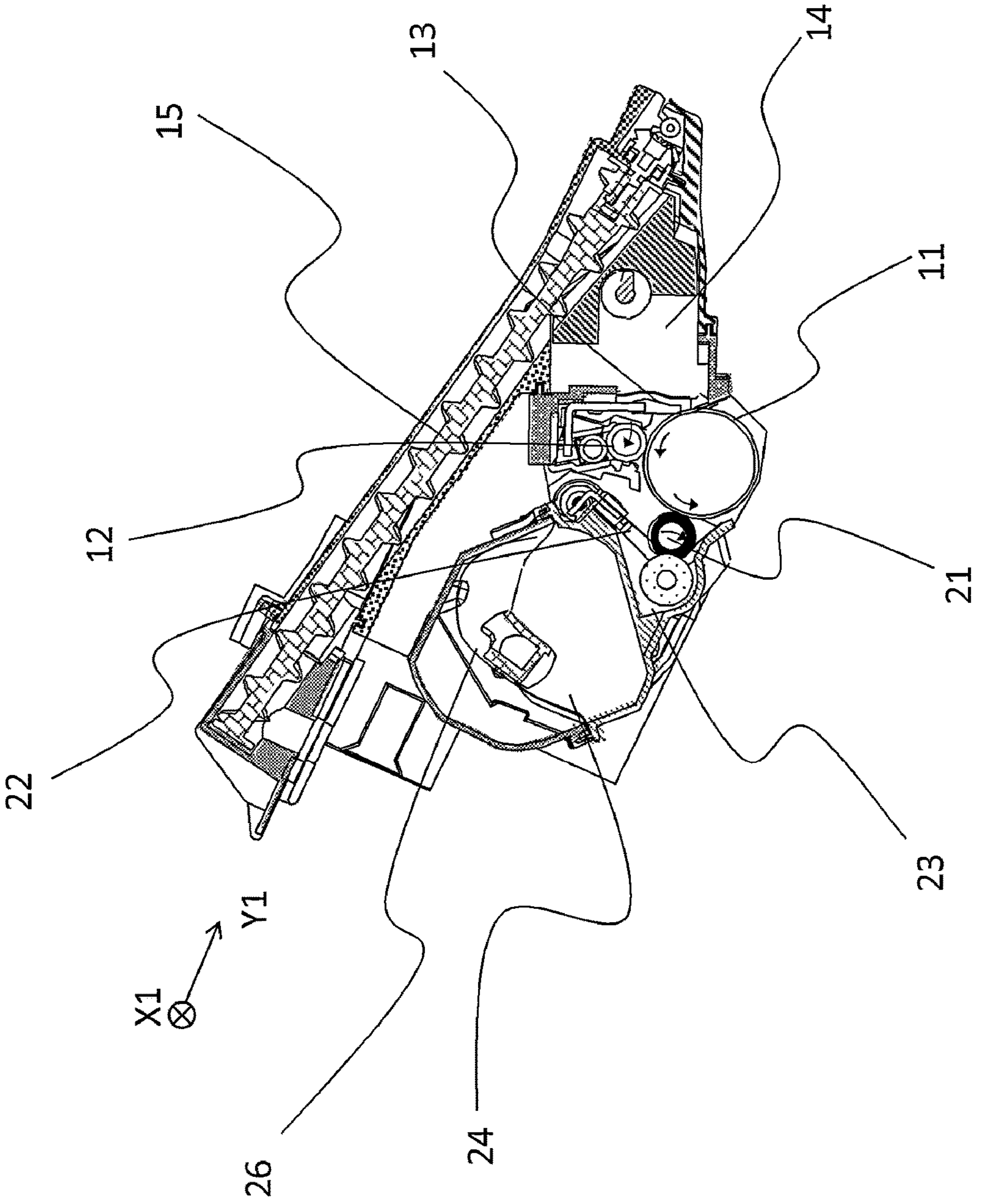
FIG. 2C is a cross-sectional view illustrating a configuration of the process cartridge.

Next, the process cartridge 2 will be described with reference to FIGS. 2A, 2B, and 2C. FIG. 2A is a front view of the process cartridge 2. FIG. 2B is a cross-sectional view taken along line A-A illustrated in FIG. 2A, and FIG. 2C is a cross-sectional view taken along line B-B illustrated in FIG. 2A. As illustrated in FIG. 2B, the process cartridge 2 includes a cleaning unit 10 (first unit) including the photosensitive drum 11 as an image bearing member and a developing unit 20 (second unit) including the developing roller 21 as a developer carrying member that bears a developer (toner).

As illustrated in FIGS. 2B and 2C, the cleaning unit 10 includes a photosensitive drum 11, a charging roller 12 as a charging member, a cleaning blade 13 as a cleaning member, a primary waste toner storage unit 14, and a waste toner conveyance path 15.

The charging roller 12 is disposed so as to be in contact with the outer peripheral surface of the photosensitive drum 11, and the charging roller 12 charges the photosensitive drum 11 by voltage application from the apparatus body 1. Further, the charging roller 12 rotates following the photosensitive drum 11.

The cleaning blade 13 is disposed so as to be in contact with the outer peripheral surface of the photosensitive drum 11, and is a member having elasticity. The distal end of the cleaning blade 13 comes into elastic contact with the photosensitive drum 11, thereby removing toner remaining on the photosensitive drum 11 after the sheet S (to be described later) passes between the photosensitive drum 11 and the transfer roller 61. The removed toner (waste toner) is conveyed from the primary waste toner storage unit 14 to a toner cartridge (not illustrated) through the waste toner conveyance path 15.

As illustrated in FIGS. 2B and 2C, the developing unit 20 includes a developing chamber 23 in which the developing roller 21 is disposed, a developer containing chamber 24 for supplying toner to the developing chamber 23, and a receiving port 25 for receiving toner supplied from a toner cartridge (not illustrated).

The developing roller 21 supplies toner to a developing zone of the photosensitive drum 11. Then, the developing roller 21 develops the electrostatic latent image formed on the photosensitive drum 11 using toner. A developing blade 22 contacts the peripheral surface of the developing roller 21 to define the amount of toner adhering to the peripheral surface of the developing roller 21. At the same time, triboelectric charge is applied to the toner.

The toner stored in the developer containing chamber 24 is sent to the developing chamber 23 by the rotation of a stirring member 30 and supplied to the developing roller 21. The toner amount is detected by remaining amount detecting means (not illustrated) in the developer containing chamber 24, and in a case where the toner amount in the developer containing chamber 24 becomes a certain amount or less, the toner is supplied from a toner cartridge (not illustrated) to the process cartridge 2.

Figure 3A:
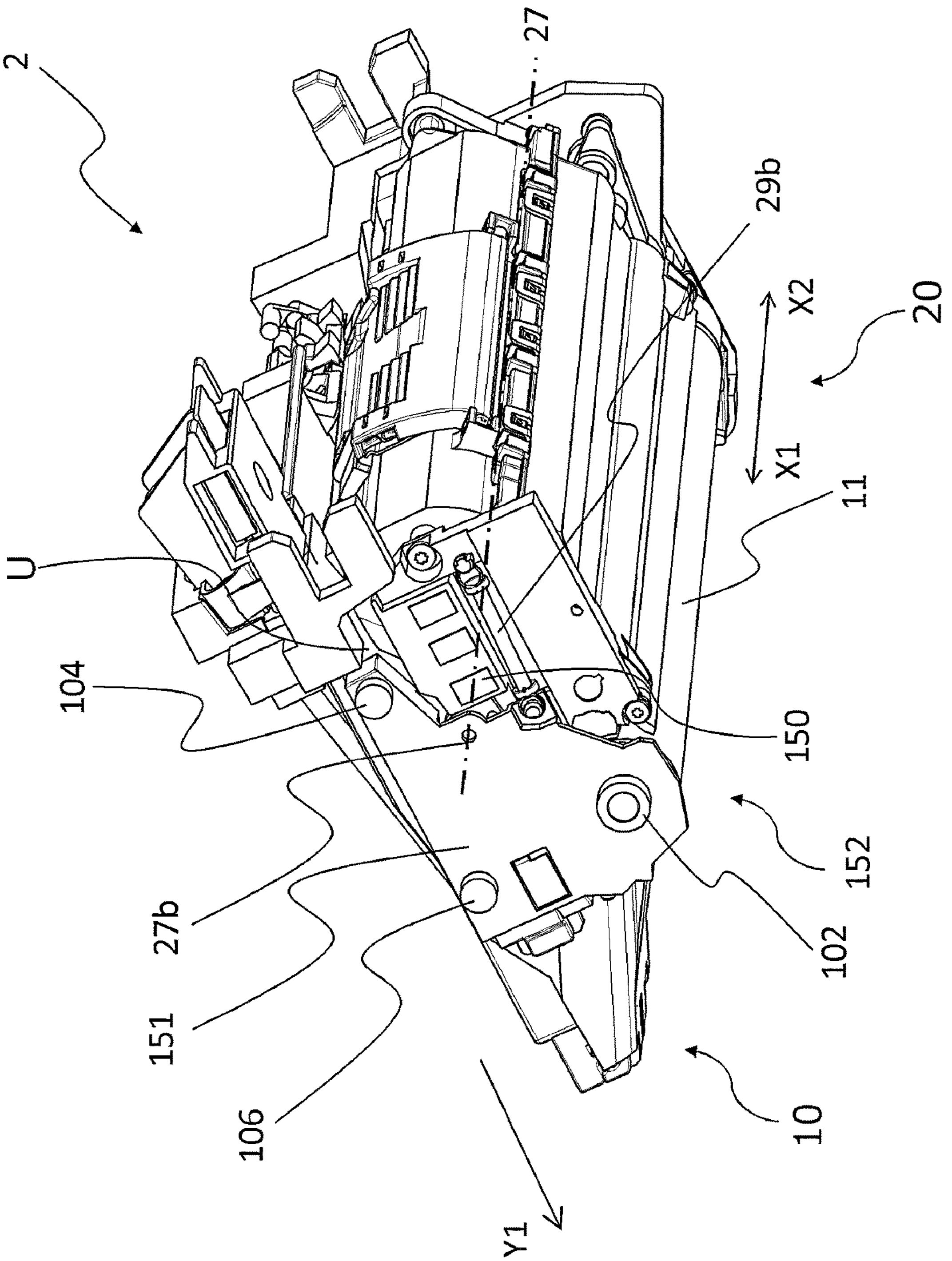
FIG. 3A is an external perspective view illustrating a configuration of the process cartridge.
Figure 3B:
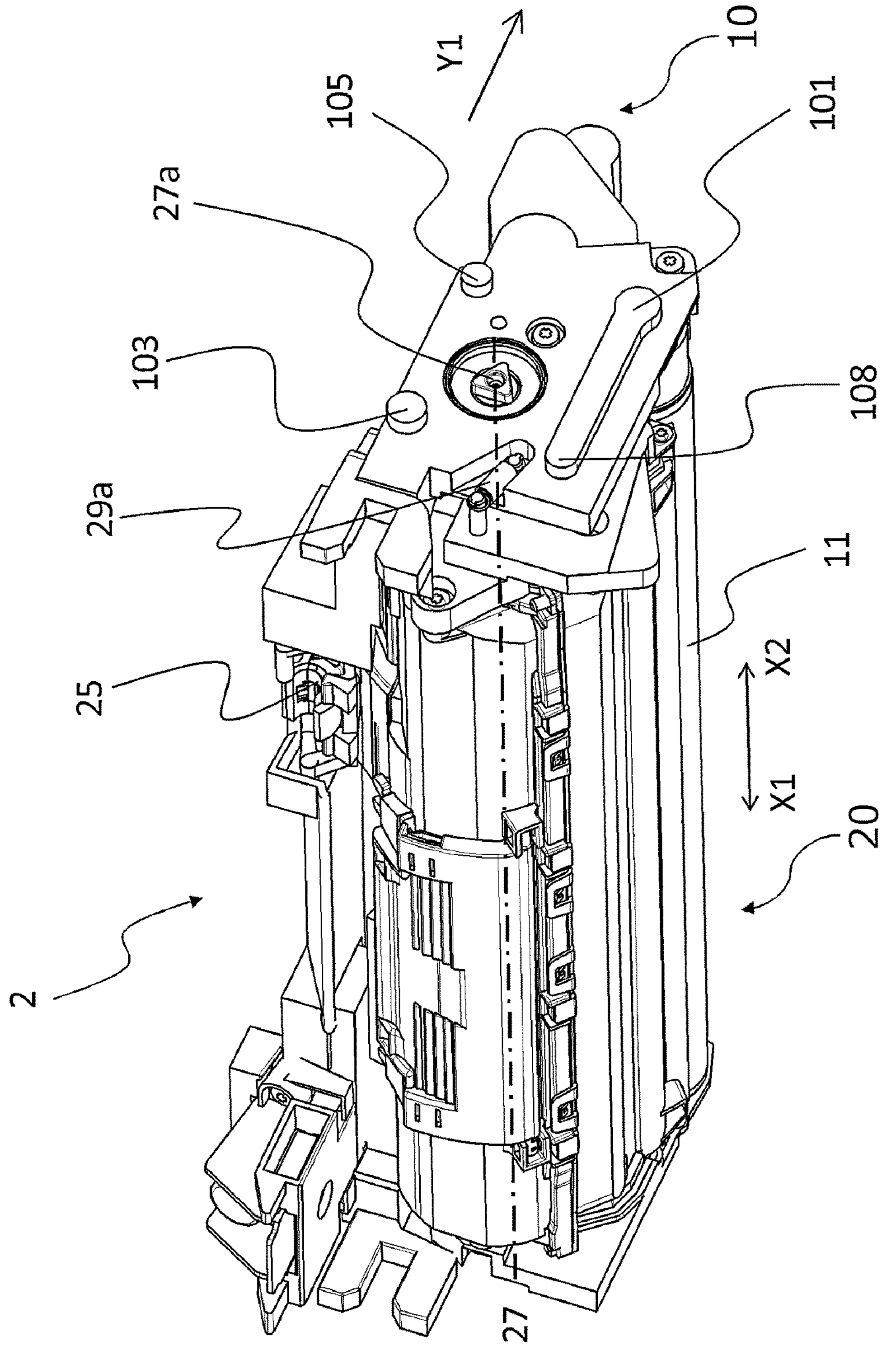
FIG. 3B is an external perspective view illustrating a configuration of the process cartridge.

FIGS. 3A and 3B are external perspective views of the process cartridge 2, FIG. 3A is a view of the apparatus body 1 as viewed from the lower right, and FIG. 3B is a view of the apparatus body 1 as viewed from the lower left. The right direction of the apparatus body 1 is the X1 direction (the front side of the paper surface of FIG. 1), and the left direction is the X2 direction (the back side of the paper surface of FIG. 1).

The process cartridge 2 includes the cleaning unit 10 (first unit) and the developing unit 20 (second unit), and the cleaning unit 10 and the developing unit 20 are swingably connected around a swing center 27 by fulcrums 27*a* and 27*b* which are connecting portions. The swing center 27 is a straight line connecting the fulcrums 27*a* and 27*b*. A force for rotating the developing roller 21 about the swing center 27 in a direction in which the developing roller contacts with the photosensitive drum 11 acts on the developing unit 20 by pressuring springs 29*a* and 29*b* which are elastic members. In a state where the process cartridge 2 is mounted to the apparatus body 1, the developing unit 20 as the second unit is configured to be swingable.

An electrical contact 150 is provided on an end surface 152 of the process cartridge 2 in the second direction (X1 and X2 directions). Since the electrical contact 150 is provided in the developing unit 20 of the process cartridge 2, the electrical contact 150 can swing together with the developing unit 20 in a state where the process cartridge 2 is mounted to the apparatus body 1. When the electrical contact 150 contacts with a contact (contact spring 161) (described later) of the apparatus body 1, the developing unit 20 and the apparatus body 1 are electrically connected. The process cartridge 2 receives power supplied from the apparatus body 1 to the powered member 17 included in the process cartridge 2 via the electrical contact 150. Examples of the powered member 17 include voltage applying means for applying a voltage to the charging roller 12, the developing roller 21, and the like, a laser scanner 90, and the like. As will be described later, the electrical contact 150 is provided at a position facing a distal end 161d of the contact spring 161, which is the contact of a contact unit 16, at the mounting completion position.

A pressing portion 151 is provided on the end surface 152 of the process cartridge 2 in the second direction (X1 and X2 directions). As will be described later, the pressing portion 151 presses a first protrusion 160*b*, which is a protrusion of the contact unit 16, in a direction away from the mounting region.

The end surface 152 of the process cartridge 2 in the second direction (X1 and X2 directions) is provided with a recessed portion U recessed in the second direction with respect to the pressing portion 151. In the first example, the recessed portion U is a gap formed by a difference between the shape of the end surface in the second direction of the cleaning unit 10 as the first unit and the shape of the end surface in the second direction of the developing unit 20 as the second unit. As illustrated in FIG. 3A, the recessed portion U is formed above the electrical contact 150. As will be described later, when the process cartridge 2 is completely mounted to the apparatus body 1, the recessed portion U is formed in a shape that faces the first protrusion 160*b* of a holding member 160, the first protrusion 160*b* is inserted, and a gap is generated between the recessed portion U and the first protrusion 160*b*. At the mounting completion position, the first protrusion 160*b* of the holding member 160 is located inside the recessed portion U, and the first protrusion 160*b* is configured not to contact with the process cartridge 2.

The process cartridge 2 has positioning bosses 101 and 102 protruding in the left-right direction (X1-X2 direction) coaxially with the photosensitive drum 11. Rotation-preventing bosses 103 and 104 and guide bosses 105 and 106 protruding in the left-right direction are provided above the positioning bosses 101 and 102. The rotation-preventing bosses 103 and 104 are on the rear side (upstream side) in the mounting direction Y1 with respect to the guide bosses 105 and 106. Further, a pressed portion 108 is provided on the right side (the right side in FIG. 3B) in the mounting direction Y1 of the process cartridge 2 (facing the same direction as the mounting direction Y1). The pressed portion

108 and the positioning boss 101 are at both ends of the continuous line-shaped protrusion extending along the mounting direction Y1.

Figure 4:
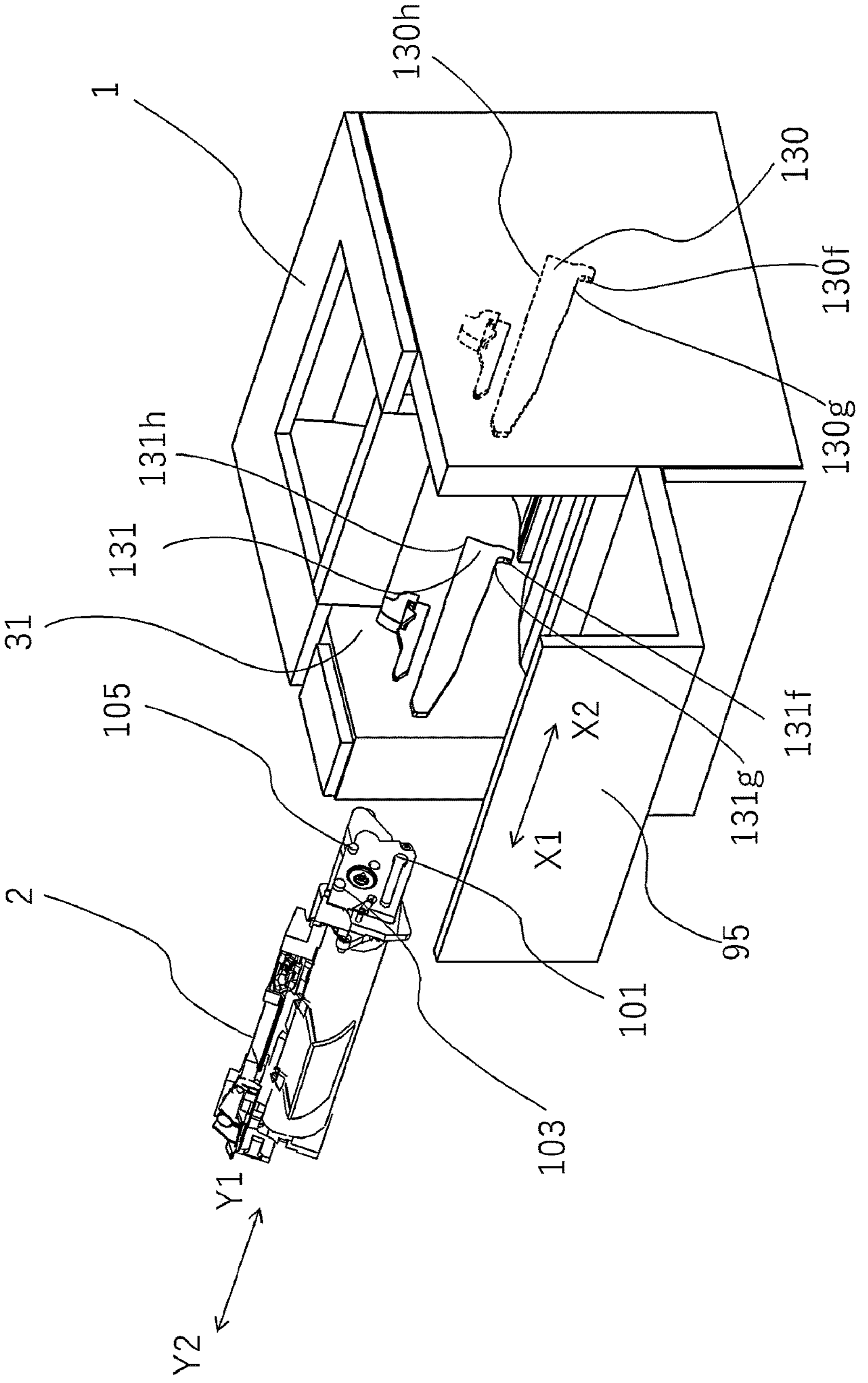
FIG. 4 is a diagram illustrating a state of attachment of the process cartridge when a door is opened.

A method of attaching and detaching the process cartridge 2 to and from the apparatus body 1 and a method of positioning the process cartridge 2 will be described with reference to FIGS. 3A and 3B, 4, and 5. As illustrated in FIG. 4, the apparatus body 1 has a frame body 31 in which a mounting region, which is a space where the process cartridge 2 is mounted, is provided. An opening/closing door 95 is rotatably provided with respect to the apparatus body 1, and FIG. 4 illustrates a state in which the opening/closing door 95 is opened. A mounting direction of the process cartridge 2 with respect to the apparatus body 1 is indicated by Y1, and a removal direction is indicated by Y2. The apparatus body 1 has guide rails 130 and 131 for restricting movement of the process cartridge 2 in a direction perpendicular to the mounting direction Y1 and the removal direction Y2 of the process cartridge 2 and guiding the process cartridge 2 extending in the Y1 direction. The guide rails 130 and 131 constitute the frame body 31. The guide rails 130 and 131 have contact surfaces 130*f* and 131*f* perpendicular to the mounting direction Y1 and contact surfaces 130*g* and 131*g* parallel to the mounting direction Y1, respectively. The positioning bosses 101 and 102 of the process cartridge 2 are in contact with the contact surface. Further, the guide rail 131 has a contact surface 131*h* that contacts with the rotation-preventing boss 104 of the process cartridge 2 to stop rotation. The guide rail 130 has a contact surface 130*h* that contacts with the rotation-preventing boss 103 to stop rotation.

Configurations of an electrical contact of the process cartridge 2 and a contact of the apparatus body 1 will be described with reference to FIGS. 5 and 6A to 6I. For easy understanding in both the drawings, a side plate of the apparatus body 1 on which the guide rails 130 and 131 are provided and a circuit board to which a contact (contact spring 161) of the apparatus body 1 is connected on the apparatus body 1 side are not illustrated.

The apparatus body 1 includes a contact unit 16 that includes a contact and a protrusion protruding toward the mounting region, and in which the contact and the protrusion are movable against an elastic force in a direction away from the mounting region (X1 direction). The contact unit 16 is provided in an end in the second direction X2 of the guide rail 131 as a frame body. The contact unit 16 includes a contact spring 161 which is a contact capable of coming into contact with the electrical contact 150 of the process cartridge 2, and a holding member 160 which holds the contact spring 161 and is movable in the second direction X2 by the contact spring 161 being compressed. The contact unit 16 can move to the following positions depending on the state of the process cartridge 2 in the mounting process.

First position: a position in a non-mounted state when the process cartridge 2 is not mounted to the apparatus body 1

Second position: a position in a mounted state when the process cartridge 2 is mounted to the apparatus body 1

Figure 5:
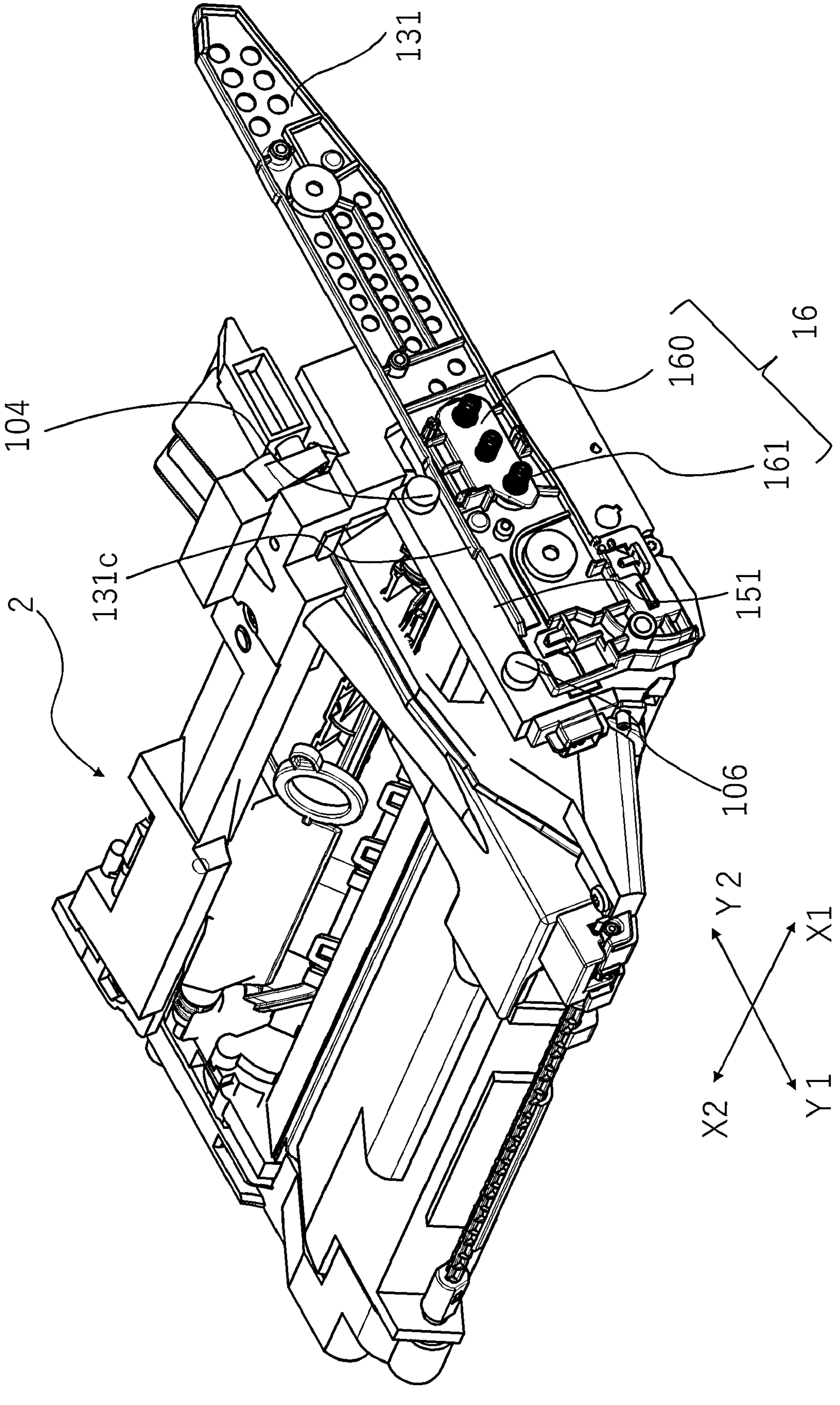
FIG. 5 is a diagram illustrating a guide rail of the process cartridge and the apparatus body of a first example.

Third position: a position in a middle state when the process cartridge 2 transitions from the non-mounted state to the mounted state The first position can also be said to be a state in which the process cartridge 2 does not exist in the apparatus body 1 or a state in which the process cartridge 2 exists in the apparatus body 1 but does not face (does not contact with) the holding member 160. FIG. 5 illustrates a state (mounted state) in which the process cartridge 2 is completely mounted to the apparatus body 1. The contact unit 16 including the holding member 160 and the contact spring 161 is provided on the guide rail 131 provided in the apparatus body 1. The contact spring 161 is a contact on the apparatus body 1 side, has conductivity, and contacts with the electrical contact 150 of the process cartridge 2 illustrated in FIG. 3A when the mounting of the process cartridge 2 is completed, so that the process cartridge 2 and the apparatus body 1 are electrically connected. The electrical contact 150 of the process cartridge 2 can face and contact with the contact spring 161 which is the contact of the contact unit 16 in the mounted state, and the pressing portion 151 can face and contact with the holding member 160 in the X2 direction in the middle state.

Figure 6A:
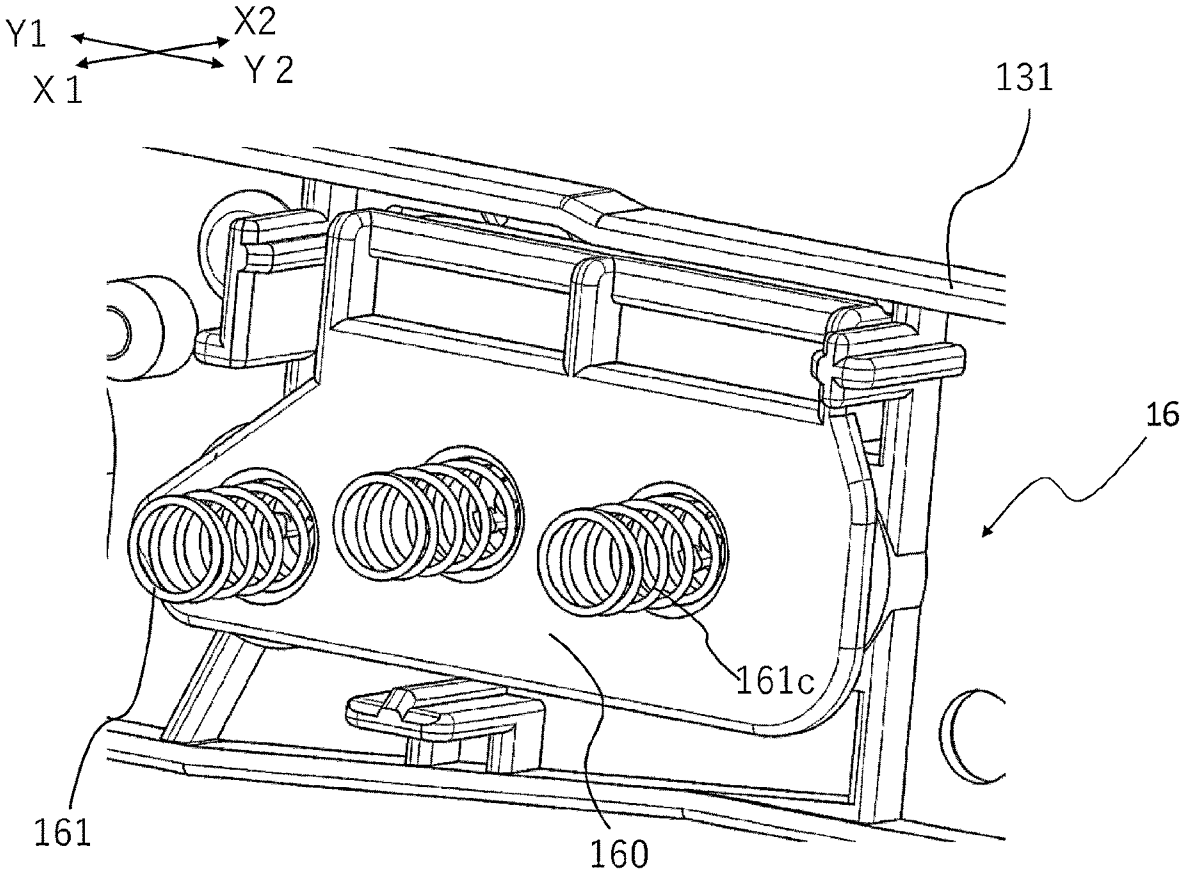
FIG. 6A is an external perspective view illustrating a guide rail and a contact unit of the first example.
Figure 6B:
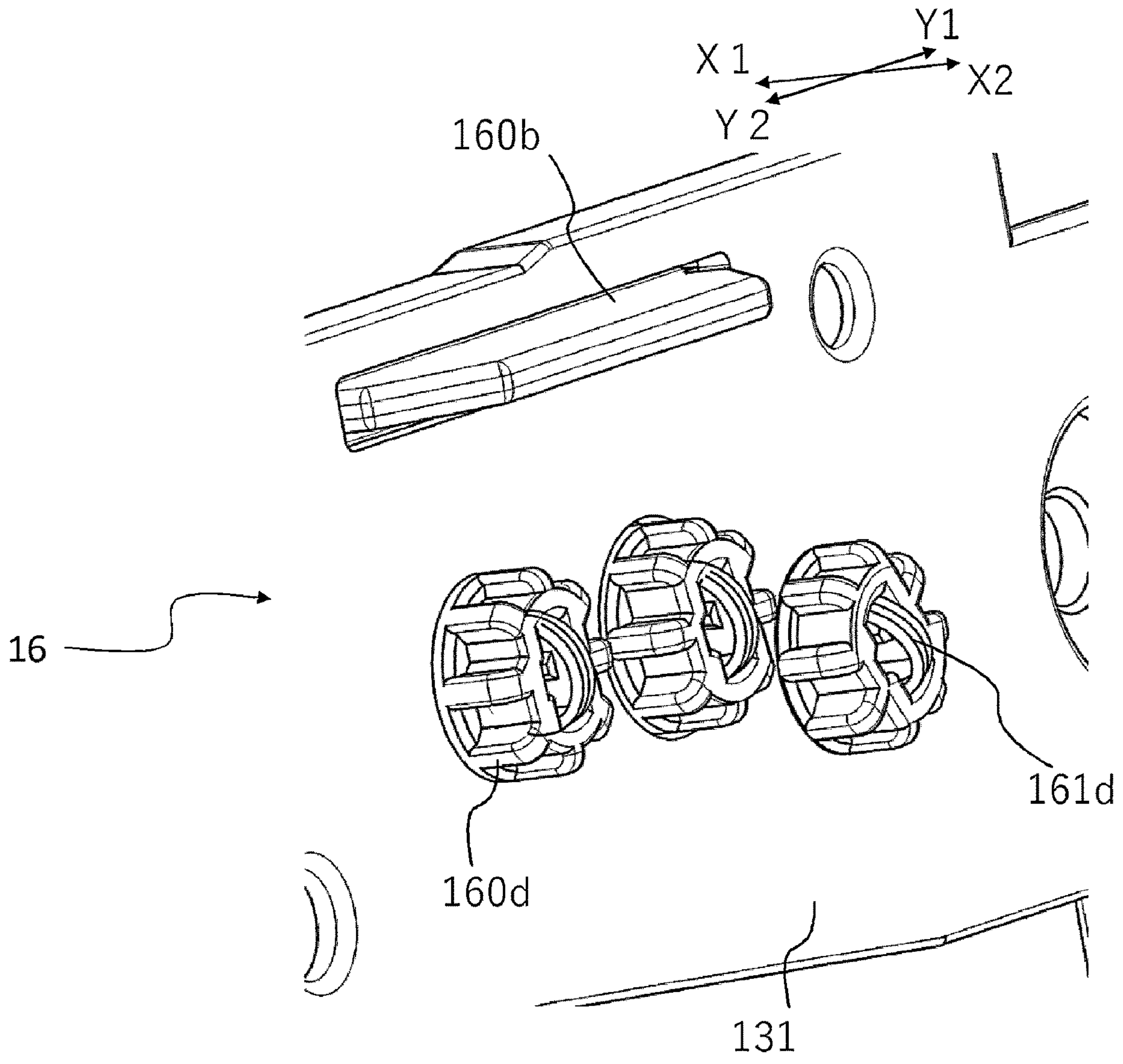
FIG. 6B is an external perspective view illustrating the guide rail and the contact unit of the first example.
Figure 6C:
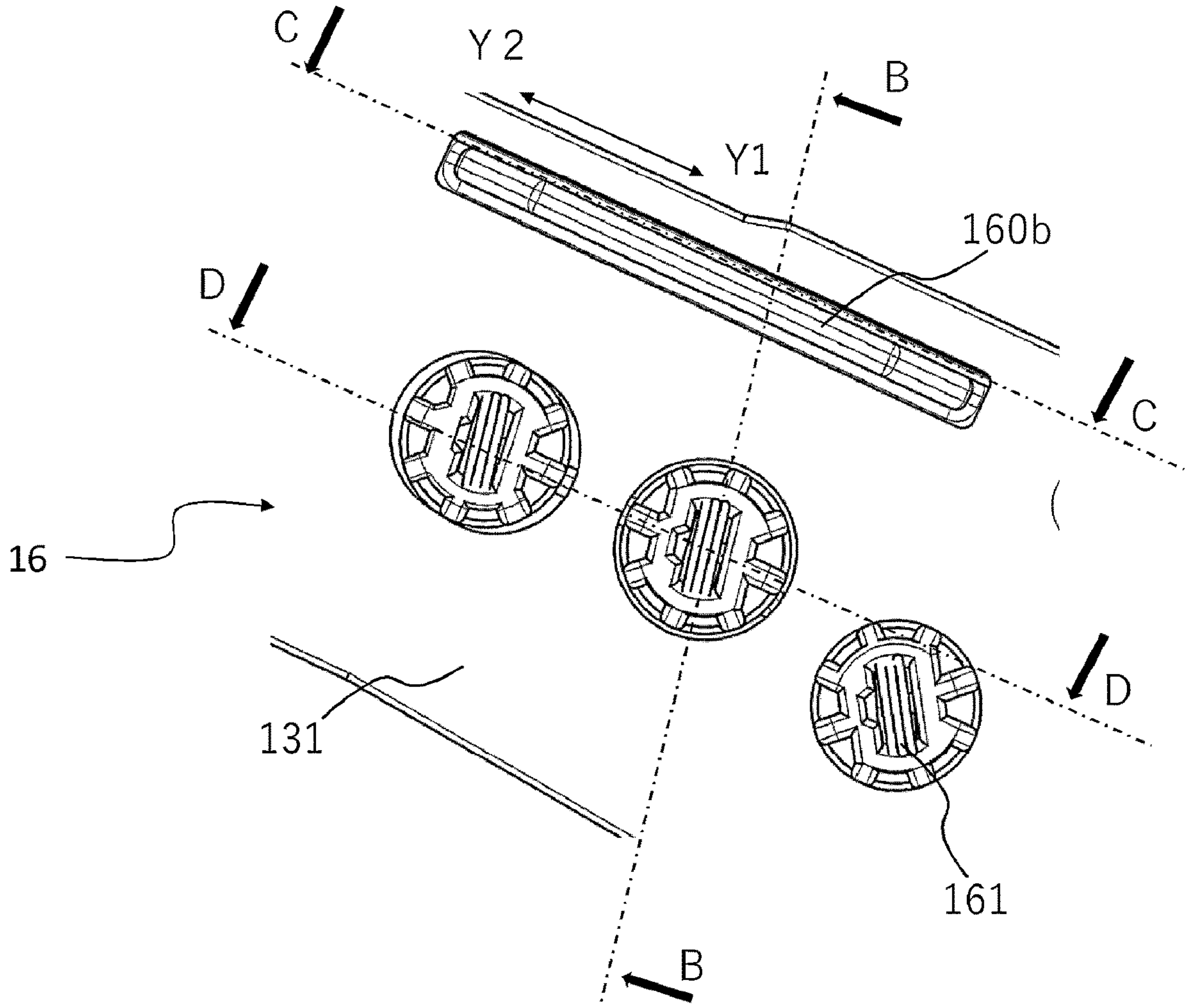
FIG. 6C is a front view illustrating the guide rail and the contact unit of the first example.
Figure 6D:
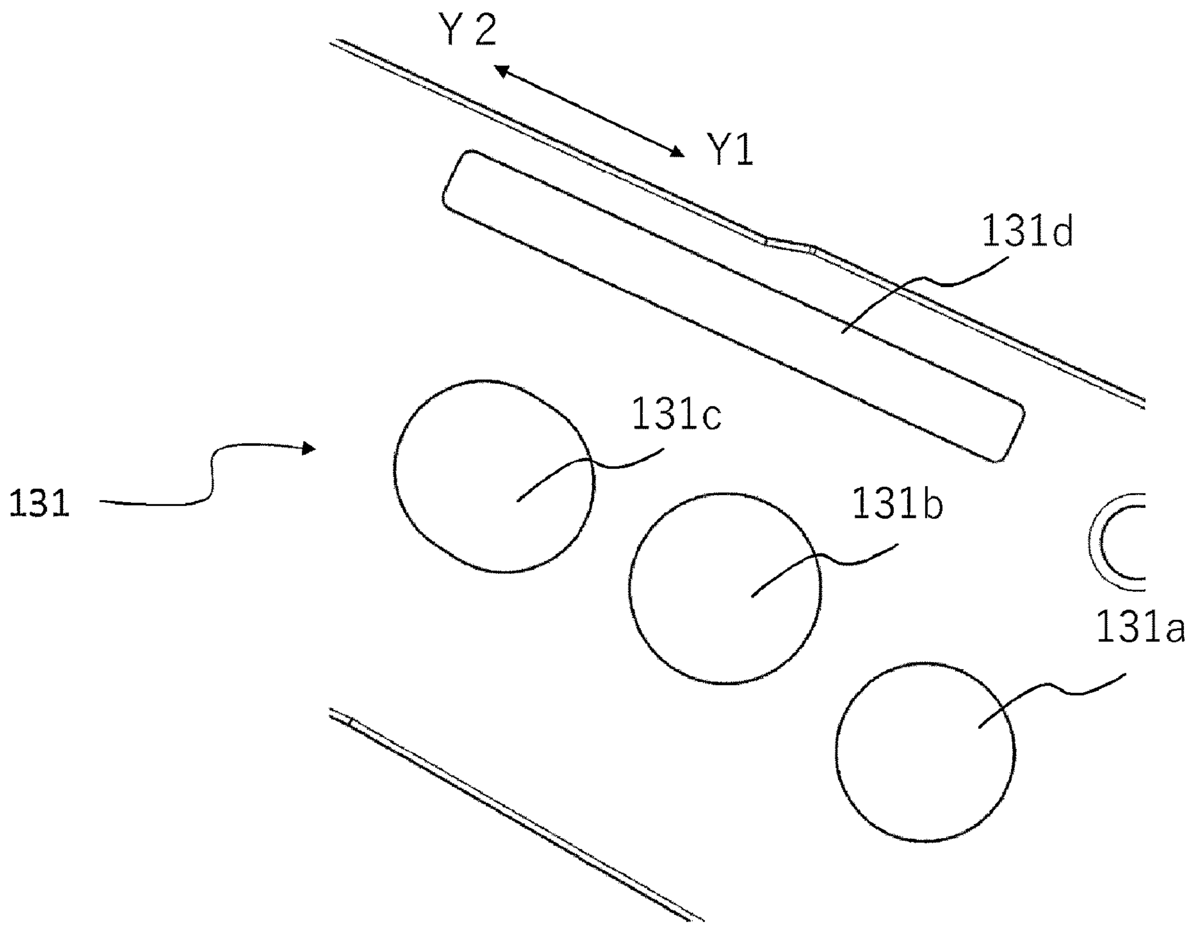
FIG. 6D is a front view of the guide rail of the first example.
Figure 6E:
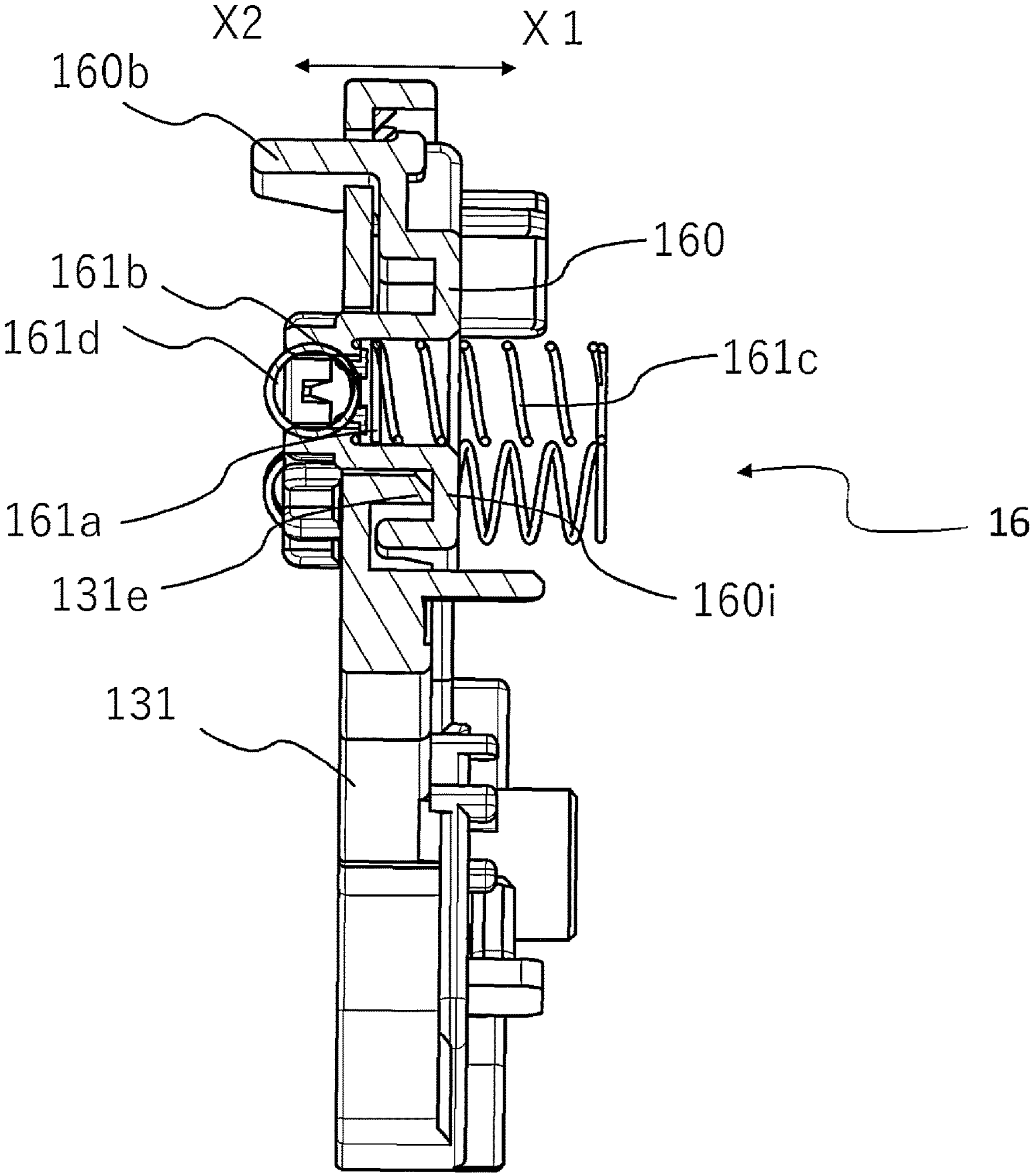
FIG. 6E is a cross-sectional view illustrating the guide rail and the contact unit of the first example.
Figure 6F:
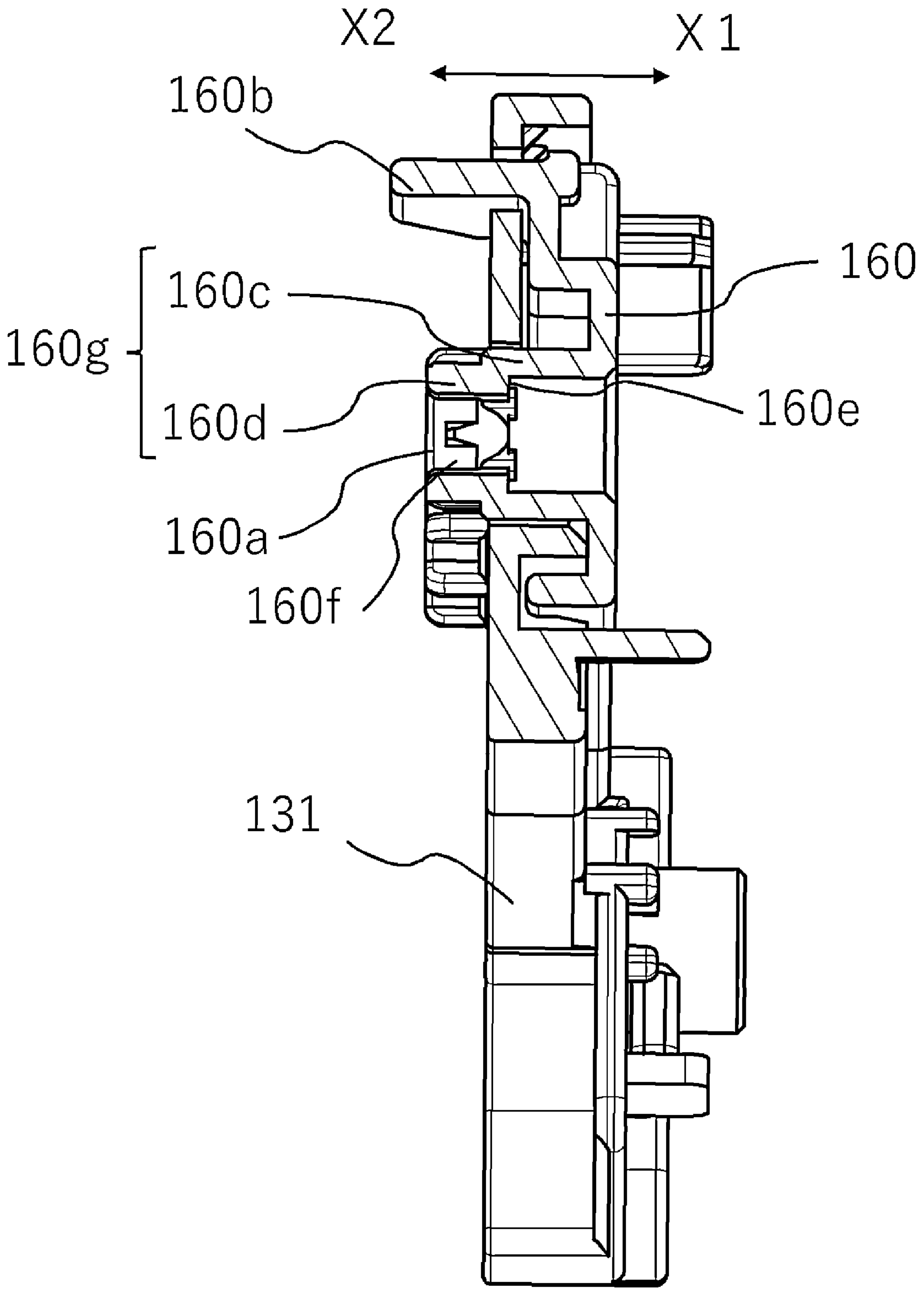
FIG. 6F is a cross-sectional view illustrating the guide rail and the contact unit of the first example.
Figure 6G:
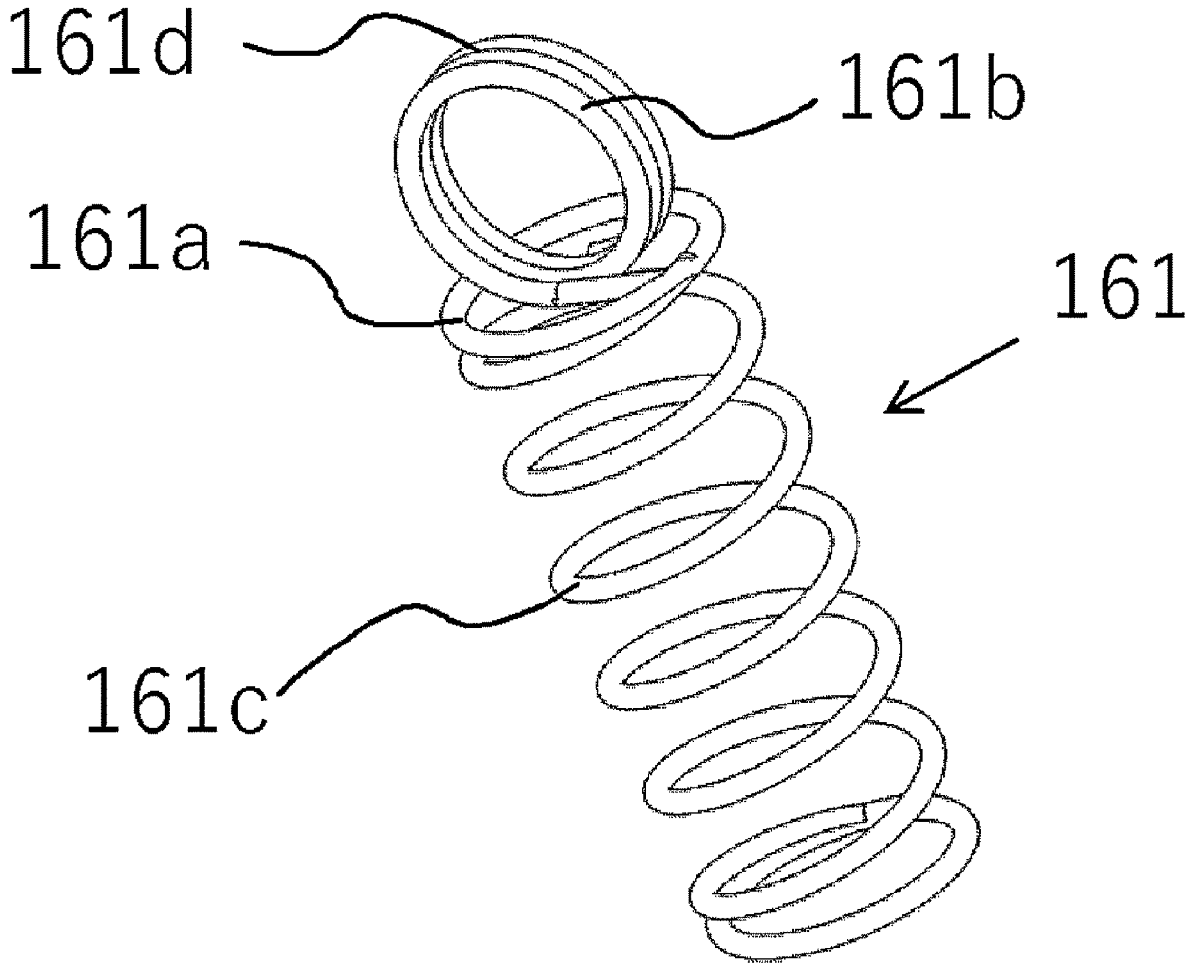
FIG. 6G is a perspective view illustrating a contact spring of the first example.
Figure 6H:
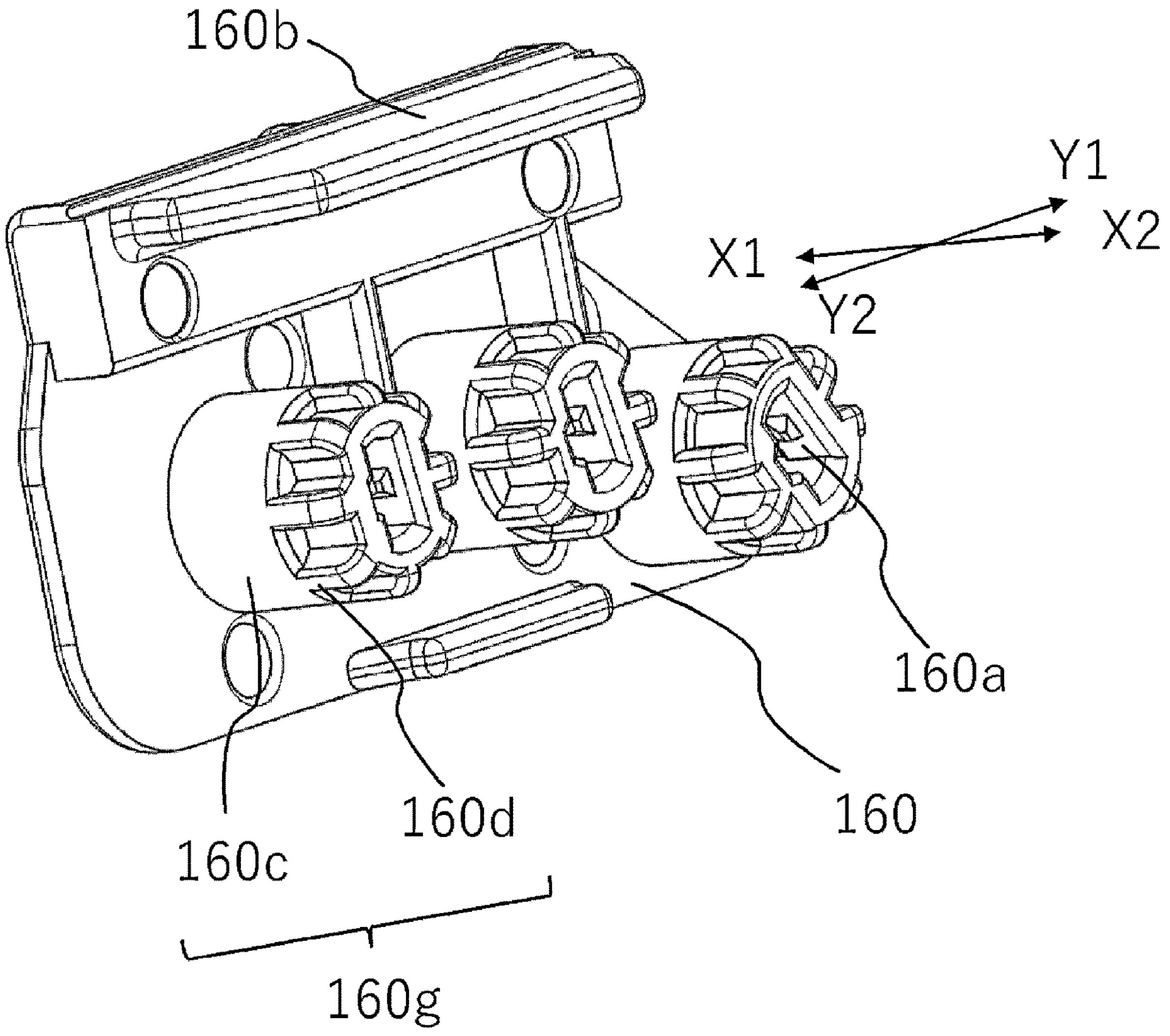
FIG. 6H is an external perspective view illustrating a holding member of the first example.
Figure 6I:
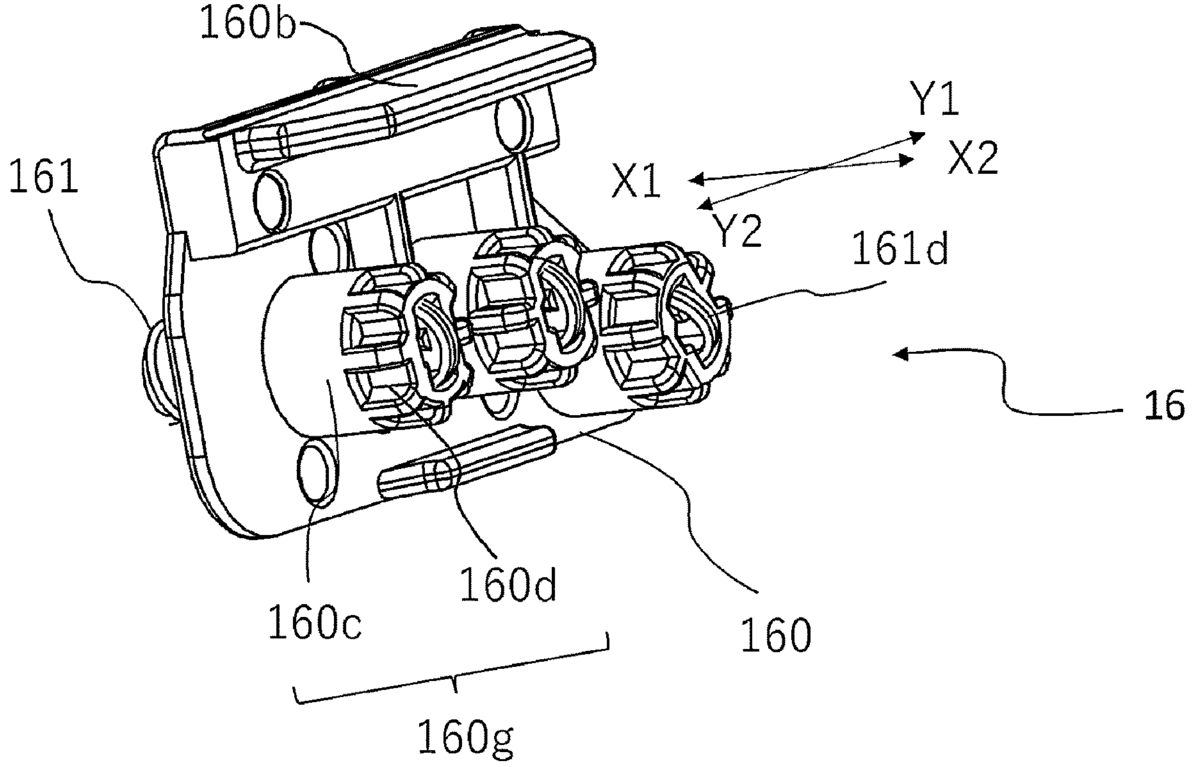
FIG. 6I is an external perspective view illustrating the contact unit of the first example.
Figure 6J:
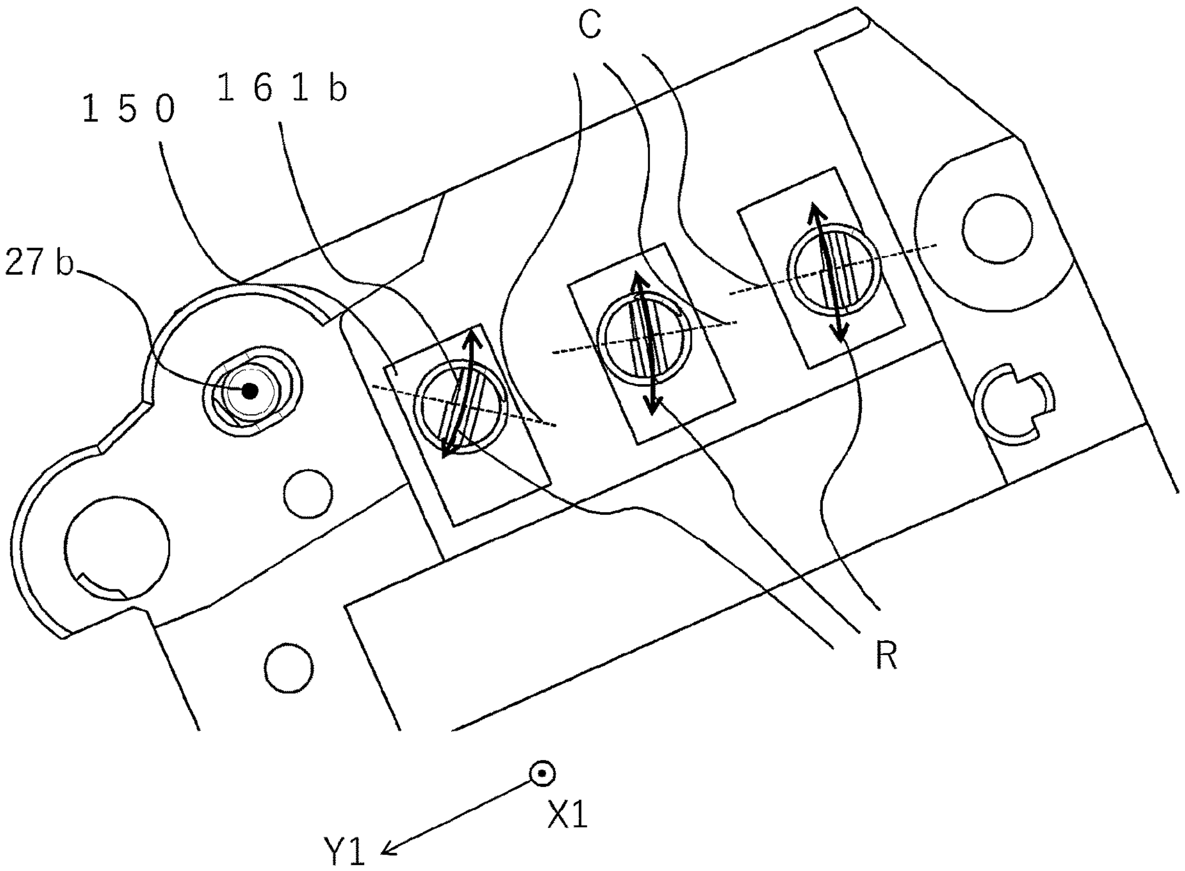
FIG. 6J is a front view illustrating the vicinity of an electrical contact of the first example.

Details of the contact unit 16 of the apparatus body 1 will be described with reference to FIGS. 6A to 6I. FIG. 6A is an enlarged external perspective view of the contact unit 16 of the apparatus body 1 in FIG. 5, and FIGS. 6B and 6C are an external perspective view and a front view of the contact unit 16 as viewed from the inside of the apparatus body 1 (the side of the mounting region). FIG. 6D is an enlarged view of the guide rail 131 in the vicinity of a position where the contact unit 16 is mounted. FIG. 6E is a cross-sectional view taken along line BB of the contact unit 16 in FIG. 6C, and FIG. 6F is a cross-sectional view taken along line BB in a state where the contact spring 161 is removed from the contact unit 16. FIG. 6G is a perspective view of the contact spring 161, FIG. 6H is a perspective view of the holding member 160, and FIG. 6I is a perspective view illustrating the contact unit 16 with contact spring 161 mounted in FIG. 6H. FIG. 6J is a diagram illustrating the vicinity of the electrical contact 150 of the process cartridge 2 in the mounted state.

A configuration of the contact unit 16 will be described. The contact unit 16 includes the contact spring 161 and the holding member 160 that holds the contact spring 161.

Contact Spring

The contact spring 161 will be described. The contact spring is a compression coil spring in which the second direction (X1 direction) is a compression direction, and includes the contact spring 161 in which a distal end on the side of the mounting region functions as a contact that contacts with the electrical contact 150 of the process cartridge 2. As illustrated in FIG. 6G, the contact spring 161 includes a coil portion 161*c* constituting a compression spring, and a protrusion 161*b* protruding from an end 161*a* of the coil portion 161*c* in the axial direction of the coil portion 161*c*. The protrusion 161*b* has a coil shape wound around an axis perpendicular to the central axis of the coil portion 161*c*.

As illustrated in FIG. 3A, the process cartridge 2 includes a developing unit 20 and a cleaning unit 10 that are swingably connected around a swing center 27. The electrical contact 150 is provided in a unit that swings in the process cartridge 2 mounted to the apparatus body 1. In the first example, the electrical contact 150 is provided in the developing unit 20, and the electrical contact 150 also swings when the developing unit 20 swings around the swing center 27 with respect to the cleaning unit 10. As illustrated in FIG. 6J, a plane perpendicular to a central axis C of the protrusion 161*b* of the contact spring 161 is substantially parallel to the tangential direction of the electrical contact 150 in the swing direction R. A shape obtained by projecting the distal end 161*d* of the protrusion 161*b* of the contact spring 161, which is in contact with the electrical contact 150, onto the electrical contact 150 in the X2 direction is parallel to the tangential direction in the swing direction R. In other words, the central axis C of each protrusion 161*b* is substantially orthogonal to the swing direction R of the electrical contact 150 at each position of the protrusion 161*b*.

The coil portion 161*c* and the protrusion 161*b* are formed of a continuous conductive member. The coil portion 161*c* is connected to an electric circuit (not illustrated) of the apparatus body 1. As will be described later, the distal end 161*d* of the protrusion 161*b* is configured to be contactable with the electrical contact 150 when the process cartridge 2 is in the mounted state. The electrical contact 150 of the process cartridge 2 and the distal end 161*d* of the contact spring 161 are brought into contact with each other, so that the process cartridge 2 and the apparatus body 1 are electrically connected to each other. Note that the configuration of the coil portion 161*c* and the protrusion 161*b* is not limited to the above configuration as long as the coil portion 161*c* and the protrusion 161*b* are electrically connected.

The dimensional relationship between the protrusion 161*b* and the coil portion 161*c* is set so as to fall within a region obtained by projecting the coil portion 161*c* in the axial direction in a case where the protrusion 161*b* is projected in the axial direction of the coil portion 161*c*. For example, in the case of FIG. 6G, the protrusion 161*b* has a cylindrical shape, the central axis of the cylinder is orthogonal to the central axis of the coil portion 161*c*, and the outer diameter of the cylinder is smaller than the inner diameter of the coil portion 161*c*. The shapes and dimensions of the protrusion 161*b* and the coil portion 161*c* are not limited to the above configuration.

Holding Member

The holding member 160 will be described. As illustrated in FIGS. 6E, 6F, 6H, and 6I, the holding member 160 holds the contact spring 161, and is configured to be movable in the second direction (X1 and X2 directions) by the contact spring 161 being compressed. The holding member 160 includes one first protrusion 160*b* that is a protrusion protruding in the X2 direction toward the mounting region, and three second protrusions 160*g* arranged side by side along the mounting direction Y1 of the process cartridge 2. The first protrusion 160*b* has a shape extending along the mounting direction Y1 of the process cartridge 2, and the second protrusion 160*g* has a cylindrical shape.

The second protrusion 160*g* includes a cylindrical first portion 160*c* provided on the holding member 160, and a bottomed cylindrical second portion 160*d* extending from an end of the first portion 160*c* on the inner side (X2 direction) of the apparatus body 1. The inner diameter of the second portion 160*d* is smaller than the inner diameter of the first portion 160*c*. An opening 160*a* is provided at the bottom of the second portion 160*d*, and a through hole 160*f* is formed inside the first portion 160*c* and the second portion 160*d*. A step portion 160*e* is formed at a boundary portion between the first portion 160*c* and the second portion 160*d*.

The inner diameter of the second portion 160*d* is larger than the outer diameter of the protrusion 161*b* of the contact spring 161. The contact spring 161 is mounted to the holding member 160 such that the protrusion 161*b* is inserted into the second portion 160*d*, the end 161*a* abuts against the step portion 160*e*, and a part of the coil portion 161*c* on the inner side (X2 direction) of the apparatus body 1 is inserted into the first portion 160*c*. The shapes and dimensions of the contact spring 161 and the second protrusion 160*g* are not limited to the above configuration. The second portion 160*d* and the step portion 160*e* hold the end 161*a* of the contact spring 161 in the X2 direction. The distal end 161*d* and the protrusion 161*b* of the contact spring 161 protrude in the X2 direction from the end 161*a* in the X2 direction through the through hole 160*f*. The distal end 161*d*, the protrusion 161*b*, and the coil portion 161*c* have conductivity. The end 161*a* in the X2 direction of the contact spring 161 is not fixed to the step portion 160*e*, and when the distal end 161*d* is pushed in the X1 direction by the process cartridge 2, the distal end 161*d* is away from the step portion 160*e*, and the coil portion 161*c* is compressed.

As illustrated in FIG. 6I, the distal end 161*d* of the protrusion 161*b* of the contact spring 161 is exposed from the opening 160*a* of the holding member 160 toward the mounting region of the apparatus body 1 (X2 direction), and is capable of contacting the electrical contact 150 of the process cartridge 2.

Guide Rail and Contact Unit

A relationship between the guide rail 131 and the contact unit 16 will be described. As illustrated in FIGS. 6B, 6C, 6D, and 6E, the guide rail 131 has a plurality of holes through which the first protrusion 160*b* and the second protrusion 160*g* of the holding member 160 of the contact unit 16 can pass. The holding member 160 is mounted to the guide rail 131 in a state where the first protrusion 160*b* is inserted into a hole 131*d* of the guide rail 131 and the three second protrusions 160*g* are respectively inserted into the three holes 131*a*, 131*b*, and 131*c* of the guide rail 131. The hole 131*d* into which the first protrusion 160*b* is inserted extends along the mounting direction Y1 of the process cartridge 2. The holding member 160 is provided to be relatively movable in the X1-X2 direction with respect to the guide rail 131.

In the state of being mounted to the guide rail 131, the second protrusion 160*g* of the holding member 160 and a part of the first protrusion 160*b* protrude from the surface of the guide rail 131 on the inner side (X2 direction) of the apparatus body 1. When the process cartridge 2 is in the middle state of transitioning from the non-mounted state to the mounted state, the first protrusion 160*b* is pressed by the pressing portion 151 of the process cartridge 2.

As illustrated in FIG. 6E, the guide rail 131 has a restricting portion 131*e* protruding in the X1 direction. The holding member 160 of the contact unit 16 includes a contacted portion 160*i* that can contact with the restricting portion 131*e*. The restricting portion 131*e* functions as a restricting member that restricts the movement of the contact unit 16 in the X2 direction by coming into contact with the contacted portion 160*i* in the second direction (X2 direction). The holding member 160 receives a force in the X2 direction by the contact spring 161, and when the process cartridge 2 is in the non-mounted state of not coming into contact with the holding member 160, the contact unit 16 moves to the first position by the contact between the restricting portion 131*e* and the contacted portion 160*i*.

Positioning of the guide rail 131 and the contact unit 16 will be described with reference to FIGS. 6C and 6D. The three holes 131*a*, 131*b*, and 131*c* of the guide rail 131 are provided in this order along the Y1 direction. Among the three holes, the hole 131*a* located most downstream in the Y1 direction (first direction) is circular, and has an inner diameter slightly larger than an outer diameter of the second protrusion 160*g* of the holding member 160, and is configured to be able to be fitted to the second protrusion 160*g*. The hole 131*c* located most upstream in the Y1 direction (first direction) is an oval elongated hole which is longer in the Y1 direction than the length of the second protrusion 160*g* corresponding to the hole 131*c* in the Y1 direction, and the holding member 160 can be prevented from rotating by fitting the second protrusion 160*g*. In addition, the hole 131*b* at the center in the Y1 direction is circular and has an inner diameter larger than the outer diameter of the second protrusion 160*g* of the holding member 160, and a gap is provided between the second protrusion 160*g* and the hole 131*b* and is not involved in positioning.

Figure 7:
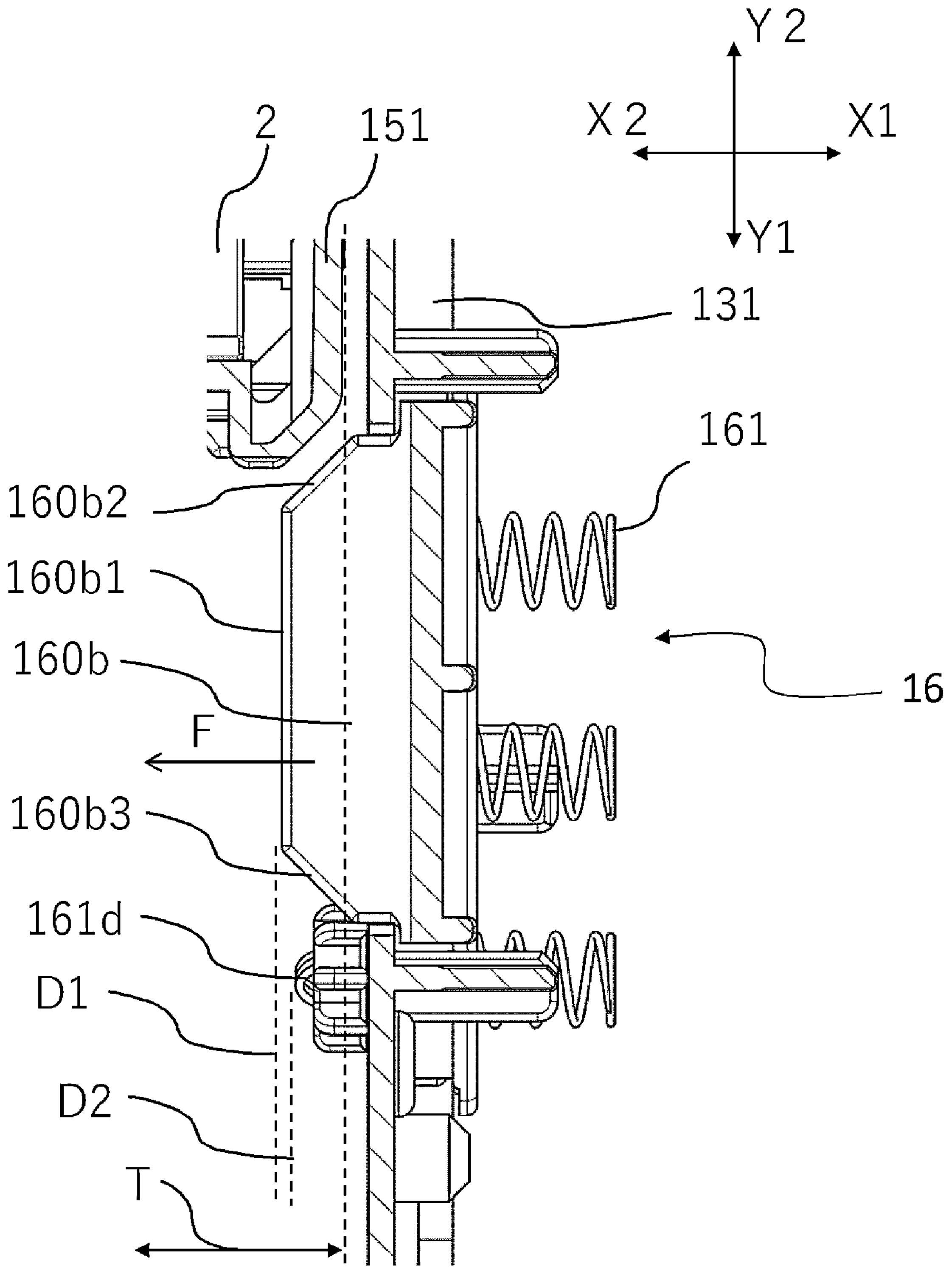
FIG. 7 is a cross-sectional view illustrating a first position of the contact unit according to the first example.
Figure 8:
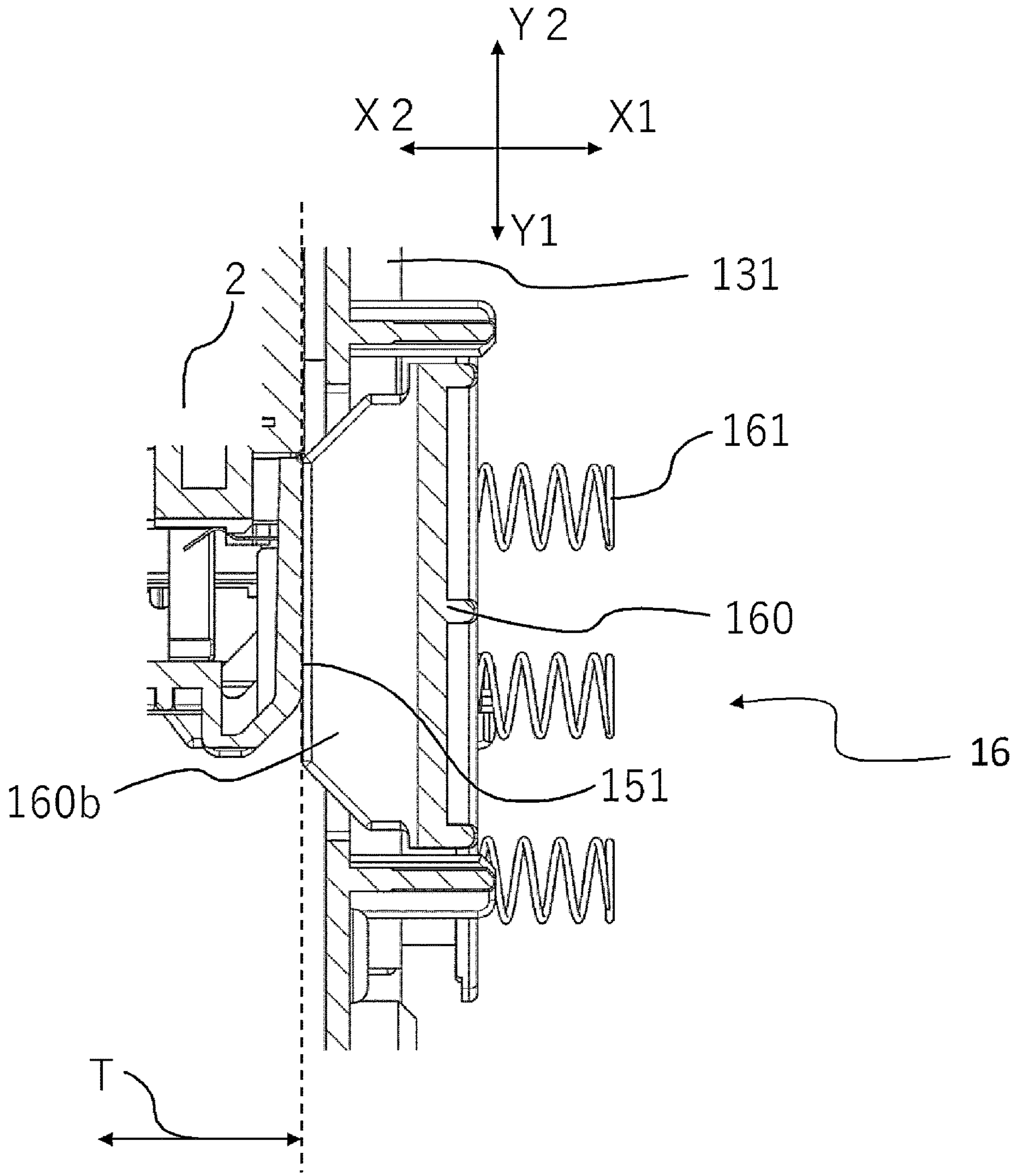
FIG. 8 is a cross-sectional view illustrating a third position of the contact unit according to the first example.
Figure 9:
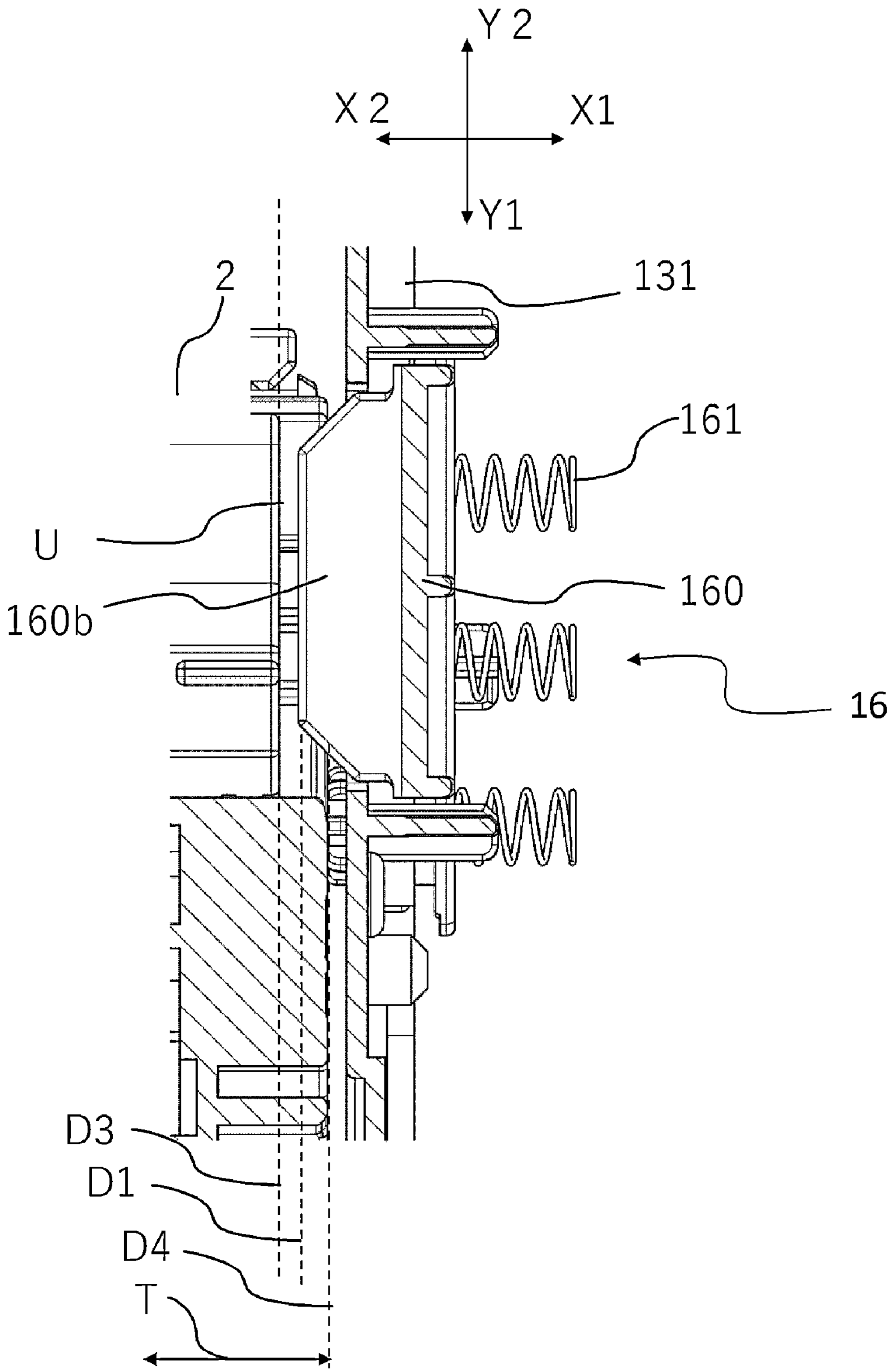
FIG. 9 is a cross-sectional view illustrating a second position of the contact unit according to the first example.

The operation of the contact unit 16 in the process of mounting the process cartridge 2 will be described. FIGS. 7, 8, and 9 are cross-sectional views taken along line CC in FIG. 6C. FIG. 7 illustrates a state in which the process cartridge 2 is in the middle state of transitioning from the non-mounted state to the mounted state and before reaching the contact unit 16. The state of FIG. 7 shows a case where the process cartridge 2 is at a position not in contact with the contact unit 16. At this time, the contact unit 16 moves to the first position by the elastic force of contact spring 161.

In FIG. 7, reference numeral D1 denotes a position of an end of the first protrusion 160*b* in the X2 direction (second direction) in a state where the holding member 160 is not in contact with the process cartridge 2. Reference numeral D2 denotes a position of an end of the protrusion 161*b* in the X2 direction (second direction) as a contact in a state where the holding member 160 is not in contact with the process cartridge 2. As denoted by reference numeral D1 in FIG. 7, the first protrusion 160*b* protrudes in the X2 direction to a mounting region T of the process cartridge 2. Further, as denoted by reference numeral D2, the protrusion 161*b* of the contact spring 161 functioning as a contact provided in the holding member 160 protrudes in the X2 direction to the mounting region T of the process cartridge 2. As illustrated in FIG. 7, the position D2 of the end of the protrusion 161*b* (the end of the contact of the contact unit 16 on the side of the mounting region) is farther from the mounting region T than position D1 of the end of the first protrusion 160*b* (the end of the protrusion of the contact unit 16 on the side of the mounting region). That is, the first protrusion 160*b* protrudes into the mounting region longer than the protrusion 161*b* as the contact. The contact spring 161 applies a force in a direction toward the mounting region T in the X2 direction to the holding member 160 as indicated by reference sign F.

FIG. 8 illustrates a state in which the process cartridge 2 advances in the Y1 direction from the state of FIG. 7 and reaches the contact unit 16, and the pressing portion 151 of the process cartridge 2 presses the first protrusion 160*b* of the contact unit 16. As illustrated in FIG. 8, the process cartridge 2 has a pressing portion 151 facing the contact unit 16 in the X2 direction in the mounting process. The pressing portion 151 corresponds to a position on the outermost side (X1 direction side) of the mounting region T of the process cartridge 2. As illustrated in FIG. 7, since the first protrusion 160*b* projects to the position D1 inside the mounting region T, as illustrated in FIG. 8, when the pressing portion 151 is at a position facing the contact unit 16, the pressing portion 151 presses the first protrusion 160*b* in the X1 direction. In a state in which the process cartridge 2 is in the middle state of transitioning from the non-mounted state to the mounted state, the contact unit 16 is pressed in the X1 direction against the force of the contact spring 161 by the pressing portion 151 of the process cartridge 2. Accordingly, the contact unit 16 moves to the third position farther from the mounting region T than the second position in the second direction.

FIG. 9 illustrates a state in which the process cartridge 2 further advances in the Y1 direction from the state of FIG. 8 and the process cartridge 2 is completely mounted. The recessed portion U is a recessed portion recessed in the X2 direction from the pressing portion 151. The recessed portion U is provided at a position facing the first protrusion 160*b* in a case where the process cartridge 2 is in the mounted state, and has a shape in which the first protrusion 160*b* can be inserted therein with a gap from the first protrusion 160*b*. When the process cartridge 2 is in the mounted state, the electrical contact 150 and the distal end 161*d* of the contact spring 161 are in contact with each other. At this time, the distance between the position D3 of the bottom of the recessed portion U in the X2 direction and the position D4 of the electrical contact 150 in the X2 direction is larger than the distance in the X2 direction between the position D4 of the distal end 161*d* in the X2 direction and the position D1 of the end of the first protrusion 160*b* in the X2 direction. Therefore, in the mounted state, the first protrusion 160*b* enters the inside of the recessed portion U without coming into contact with the end surface 152 of the process cartridge 2. As a result, the electrical contact 150 and the distal end 161*d* contact with each other, so that the contact unit 16 moves to the second position farther away from the mounting region than the first position in the second direction (X1 direction) against the force of the contact spring 161.

As illustrated in FIG. 7, the first protrusion 160*b* has a first surface 160*b*1, a second surface 160*b*2, and a third surface 160*b*3. The first surface 160*b*1 extends along the Y1 direction. The second surface 160*b*2 is an inclined surface extending obliquely in the X1 direction from the end of the first surface 160*b*1 in the Y2 direction, and the third surface 160*b*3 is an inclined surface extending obliquely in the X1 direction from the end of the first surface 160*b*1 in the Y1 direction. When the end of the process cartridge 2 in the Y1 direction contacts with the first protrusion 160*b* of the holding member 160 in the process of mounting the process cartridge 2, the end contacts with the inclined surface of the second surface 160*b*2. Then, the first protrusion 160*b* is pushed in the X1 direction while sliding on the second surface 160*b*2, and the state of FIG. 8 is obtained. Therefore, when the state of FIG. 7 transitions to the state of FIG. 8, the resistance is small.

In the non-mounted state of FIG. 7, as illustrated in FIGS. 6E, 6F, and 6G, the end 161*a* of the coil portion 161*c* of the contact spring 161 is in contact with the step portion 160*e* of the holding member 160. When the holding member 160 moves in the X1 direction at the time of transition from the non-mounted state in FIG. 7 to the middle state in FIG. 8, the contact spring 161 also moves in the X1 direction at the same time. Therefore, in the middle state of FIG. 8, the distal end 161*d* of the contact spring 161, which is the contact of the contact unit 16, does not contact with the process cartridge 2.

In the state of FIG. 9, the first protrusion 160*b* can be inserted into a space formed by the recessed portion U of the process cartridge 2 illustrated in FIG. 3A, and the contact unit 16 moves in the X2 direction from the third position in FIG. 8 to the second position. When the contact unit 16 is at the second position, the holding member 160 comes into a state away from the process cartridge 2.

Figure 10A:
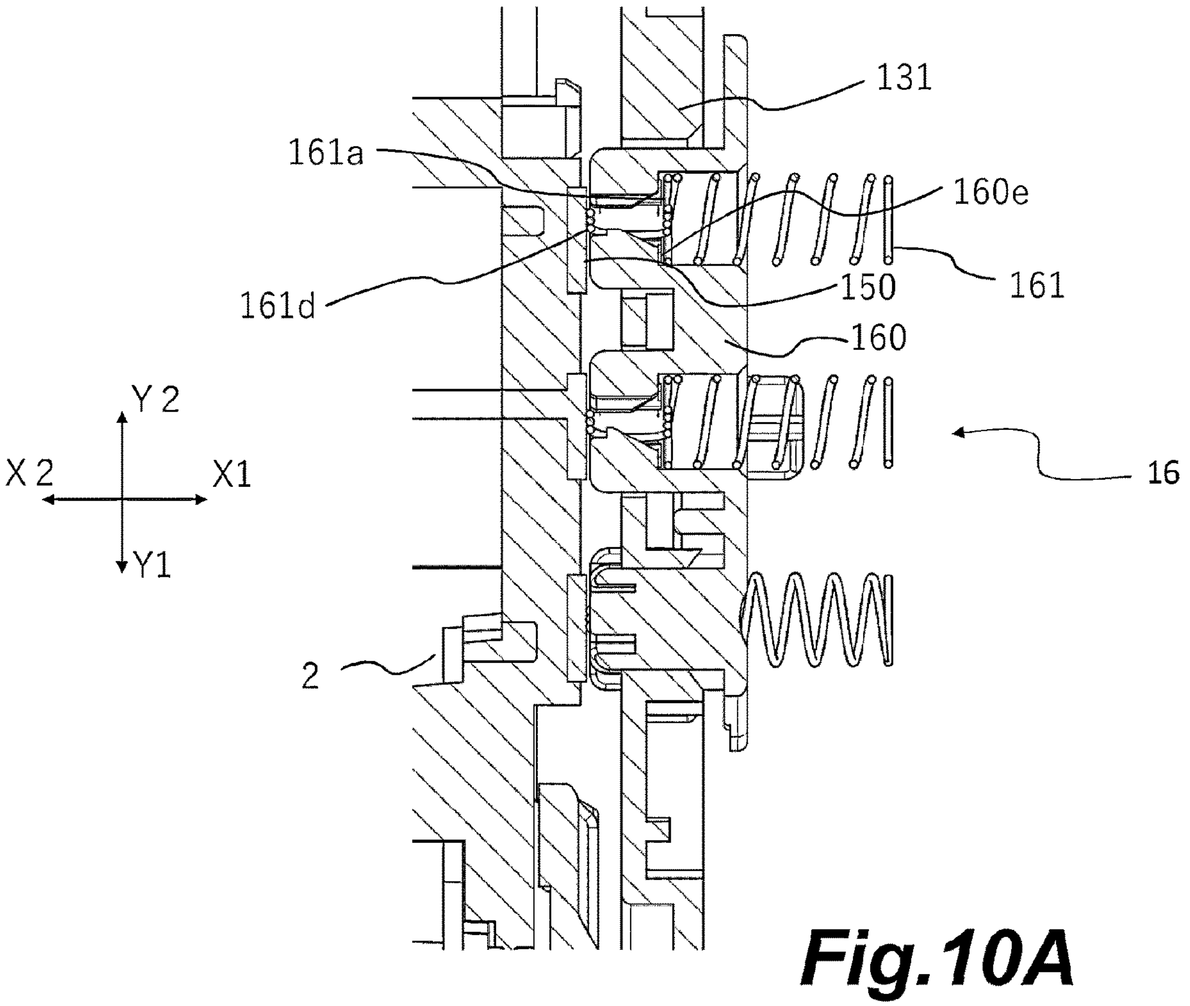
FIG. 10A is a cross-sectional view illustrating the position of a conductor at the second position of the contact unit of the first example.

FIG. 10A is a cross-sectional view taken along line DD of FIG. 6C, and illustrates a state when the process cartridge 2 of FIG. 9 is in the mounted state and the contact unit 16 is at the second position. As illustrated in FIG. 10A, the electrical contact 150 of the process cartridge 2 and the distal end 161*d* of the contact spring 161 of the contact unit 16 are in contact with each other.

Figure 10B:
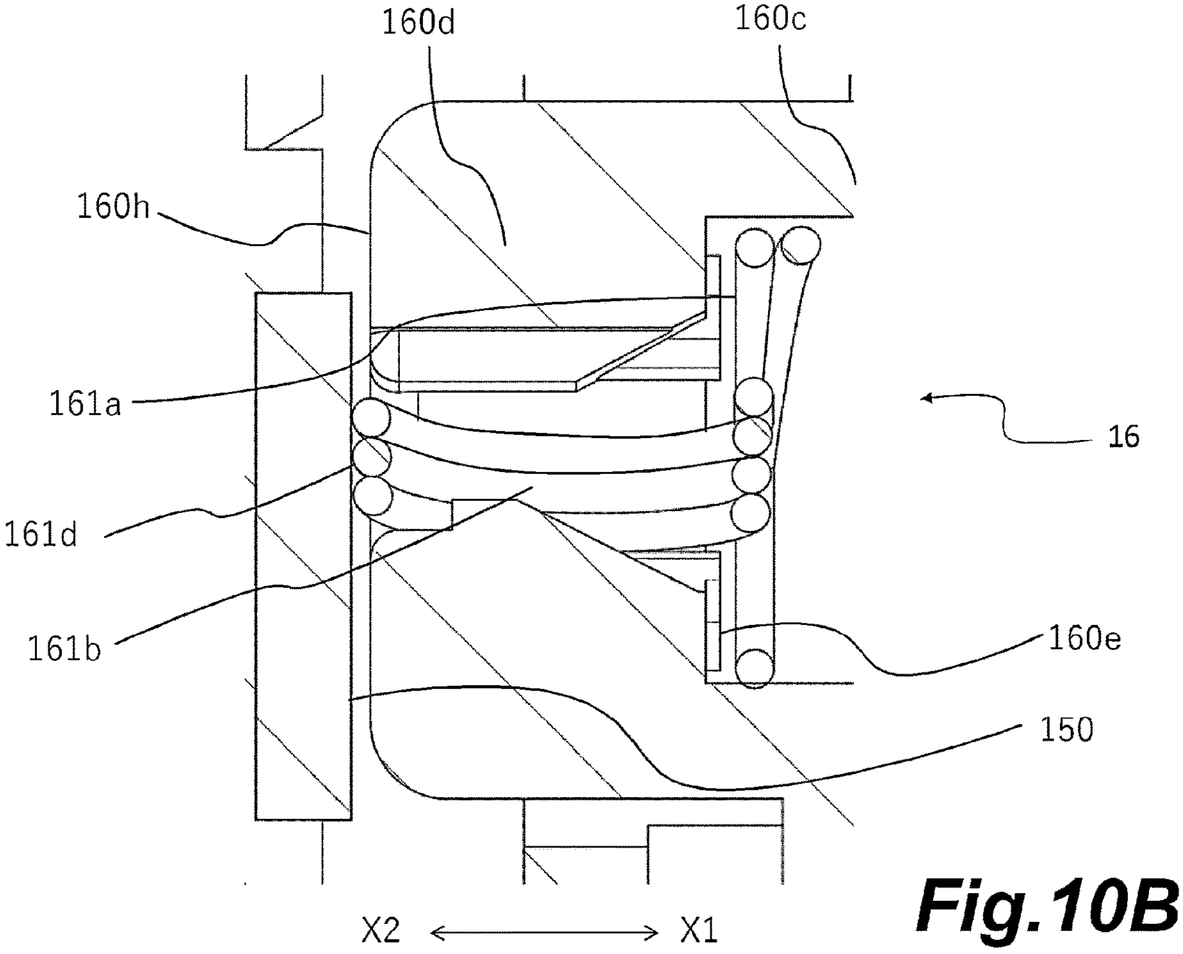
FIG. 10B is an enlarged view illustrating the position of the conductor at the second position of the contact unit of the first example.

FIG. 10B is an enlarged view of a portion of the electrical contact 150 located on the most upstream side in the Y1 direction and the second protrusion 160*g* of the holding member 160 in FIG. 10A. The distal end 161*d* of the contact spring 161 and the electrical contact 150 of the process cartridge 2 are in contact with each other. On the other hand, there is a gap between the end 161*a* of the coil portion 161*c* of the contact spring 161 and the step portion 160*e* of the holding member 160. In addition, there is also a gap between the electrical contact 150 of the process cartridge 2 and the end surface 160*h* on the X2 direction side of the second protrusion 160*g* of the holding member 160. Therefore, the force of the contact spring 161 does not act on the holding member 160. In addition, the holding member 160 is not in contact with the process cartridge 2. That is, only the contact spring 161 contacts with the electrical contact 150 of the process cartridge 2 in a state where the force in the X2 direction acts. As a result, the apparatus body 1 and the process cartridge 2 are electrically connected.

Although the operation from the start of mounting to the completion of mounting of the process cartridge 2 has been described above, the operation of removing the process cartridge 2 is an operation that proceeds in a reverse direction from the state of FIGS. 10A and 10B to the state of FIG. 7, and thus the description thereof will be omitted.

According to the first example, the contact unit 16 having the protrusion (first protrusion 160*b*) that can contact with the process cartridge 2 located upstream of the mounting completion position holds the contact (contact spring 161) on the apparatus body 1 side. Then, in the process of mounting the process cartridge 2, the pressing portion 151 of the process cartridge 2 presses the protrusion of the contact unit 16 to move the contact unit 16, and the contact moves in a direction away from the process cartridge 2. As a result, interference between the contact and the process cartridge 2 in the mounting process is suppressed. At the mounting completion position of the process cartridge 2, the protrusion of the contact unit 16 is positioned inside the recessed portion U provided in the process cartridge 2, so that the contact of the contact unit 16 and the electrical contact 150 of the process cartridge 2 can contact with each other. In the process of mounting the process cartridge 2, the process cartridge 2 first contacts with and presses the protrusion of the holding member 160. As a result, the contact unit 16 moves in a direction away from the process cartridge 2 (X1 direction), and the contact of the contact unit 16 is retracted to a position not in contact with the process cartridge 2. Therefore, the contact of the contact unit 16 is prevented from interfering with the process cartridge 2 being mounted and from being caught. Therefore, operability of the attaching and detaching operation of the process cartridge 2 can be improved with a simple configuration.

Second Example

A second example of the present invention will be described. Portions that are the same as or correspond to those in the first example are denoted with the same reference numerals, and a detailed description thereof will be omitted. In the first example, the compression coil spring also serves as the contact, but in the second example, the contact and the compression coil spring have separate configurations.

A contact unit 26 holding the contact on the apparatus body 1 side can move to the following positions according to the state of the process cartridge 2 in the mounting process.

First position: a position in a non-mounted state when the process cartridge 2 is not mounted to the apparatus body 1

Second position: a position in a mounted state when the process cartridge 2 is mounted to the apparatus body 1

Figure 11A:
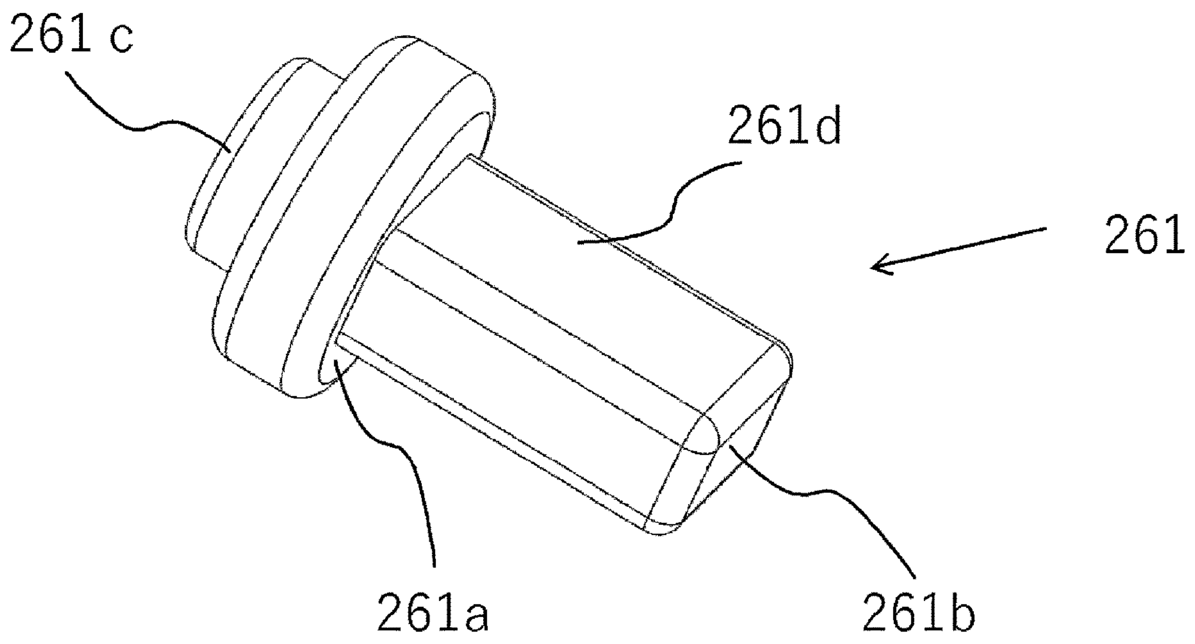
FIG. 11A is an external perspective view illustrating a conductor of a second example.
Figure 11B:
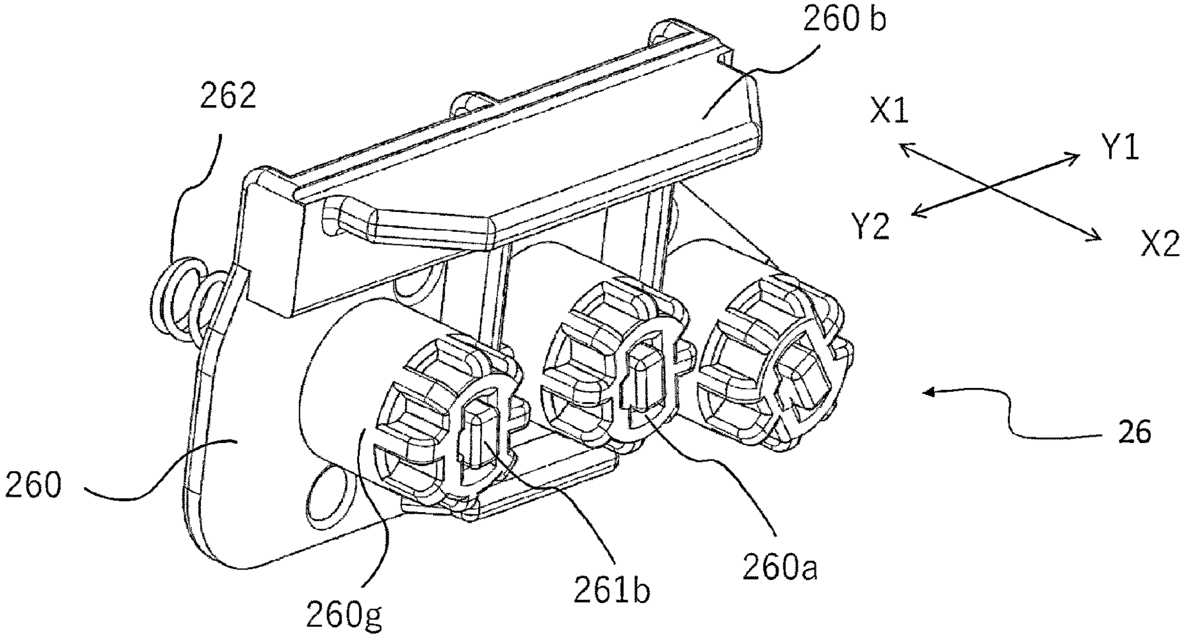
FIG. 11B is an external perspective view illustrating the contact unit of the second example.
Figure 11C:
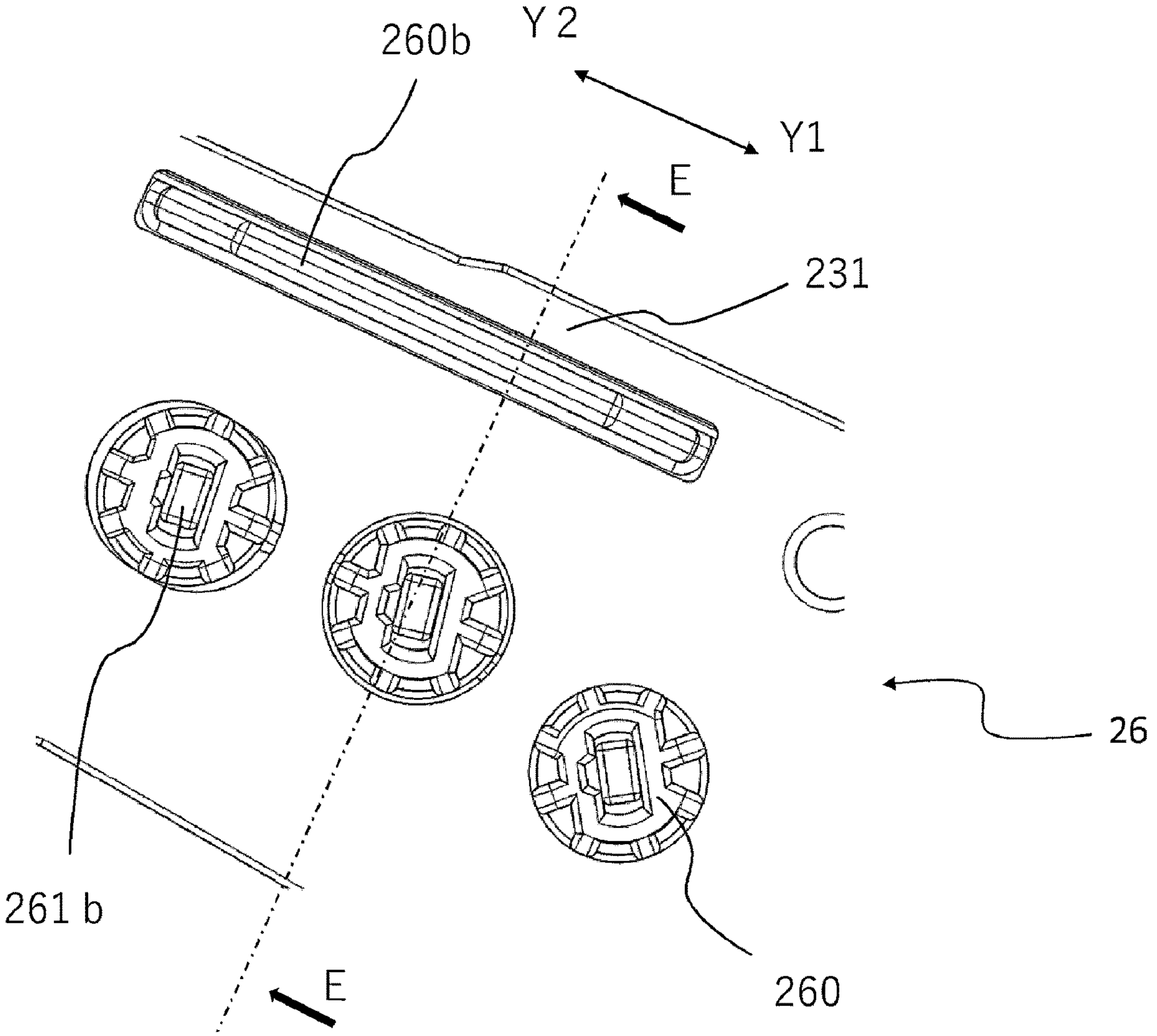
FIG. 11C is a front view illustrating the guide rail and the contact unit of the second example.
Figure 11D:
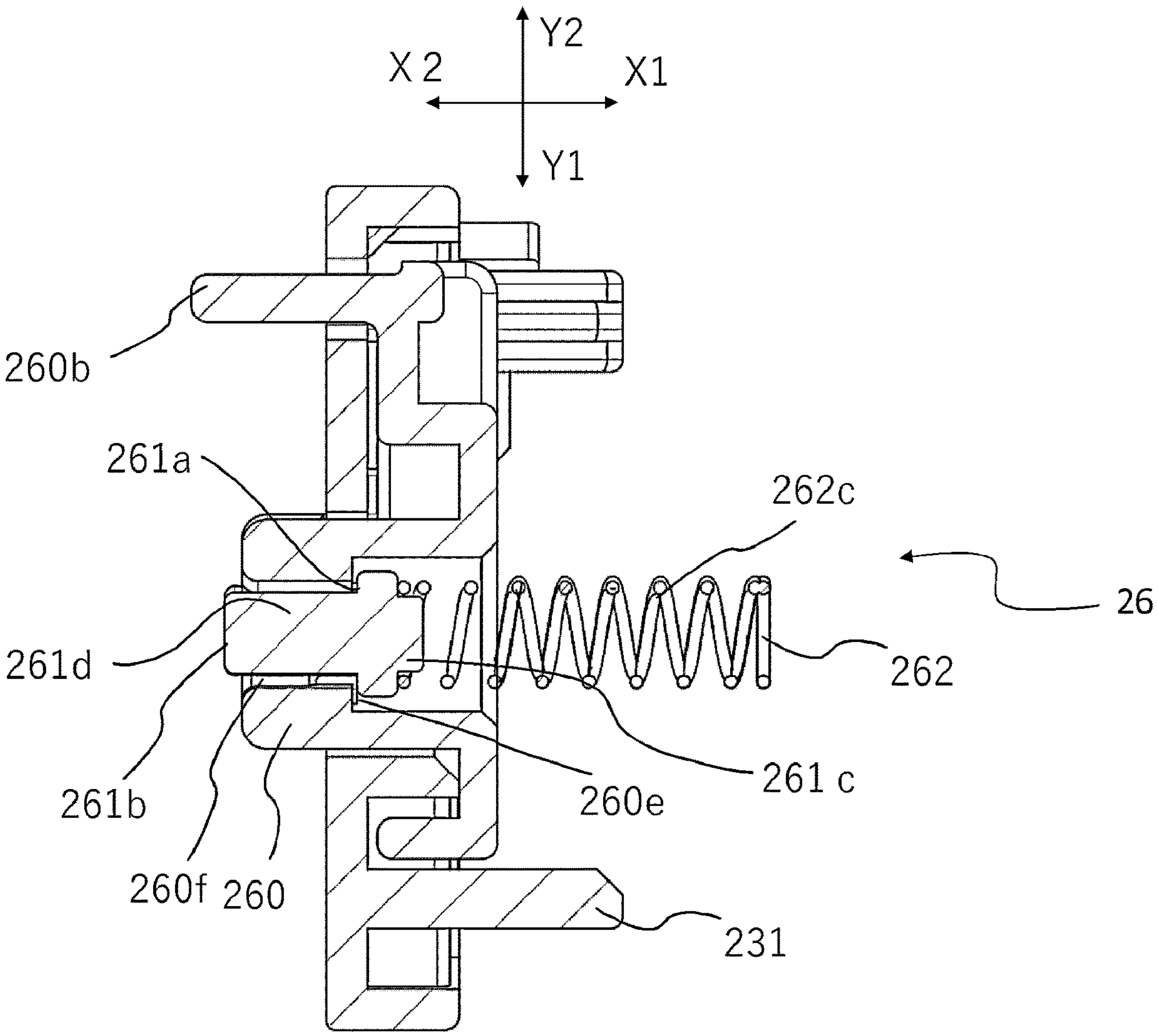
FIG. 11D is a cross-sectional view illustrating the guide rail and the contact unit of the second example.

Third position: a position in a middle state when the process cartridge 2 transitions from the non-mounted state to the mounted state The contact unit 26 of the second example includes a compression coil spring 262, a conductor 261, and a holding member 260. FIG. 11A is a perspective view illustrating the conductor 261. FIG. 11B is a perspective view of the contact unit 26, FIG. 11C is a front view of the contact unit 26, and FIG. 11D is a cross-sectional view taken along line EE of FIG. 11C. In these drawings, in order to facilitate understanding, a side plate of the apparatus body 1 provided with a guide rail 231 and a circuit board which is a connection destination of the contact of the apparatus body 1 on the apparatus body 1 side are not illustrated.

The second direction (X1 direction) of the compression coil spring 262 is the compression direction. The conductor 261 is provided in the end on the side of the mounting region of the compression coil spring 262. The holding member 260 holds the conductor 261 and is movable in the second direction by compressing the compression coil spring 262. The holding member 260 is provided with a first protrusion 260*b* which is a protrusion pressed by the pressing portion 151 when the process cartridge 2 is in the middle state. The conductor 261 is exposed from the holding member 260 toward the mounting region. Details will be described below.

As illustrated in FIGS. 11A and 11D, the conductor 261 includes a shaft portion 261*d*, a flange portion 261*a* provided in one end of the shaft portion 261*d*, and a boss 261*c* provided in the end of the flange portion 261*a* on a side opposite to the shaft portion 261*d*. The outer diameter of the boss 261*c* is smaller than the inner diameter of a coil portion 262*c* of the compression coil spring 262, and the compression coil spring 262 is mounted to the boss 261*c* by light press fitting. The flange portion 261*a* of the conductor 261 is in contact with a step portion 260*e* of the holding member 260. A distal end 261*b* of the shaft portion 261*d* of the conductor 261 on the side opposite to the flange portion 261*a* protrudes from an opening 260*a* provided in the end of a second protrusion 260*g* of the holding member 260 on the X2 direction side. The conductor 261 is provided in the end of the compression coil spring 262 in the X2 direction, has conductivity, and is a conductor separate from the compression coil spring 262.

The step portion 260*e* of the second protrusion 260*g* of the holding member 260 holds the conductor 261. The second protrusion 260*g* is provided with a through hole 260*f* penetrating in the X2 direction, and an end on the side of the mounting region of the conductor 261 is exposed to the side of the mounting region in the X2 direction through the through hole 260*f* to constitute a contact in contact with the electrical contact 150. The flange portion 261*a* of the conductor 261 is not fixed to the step portion 260*e*. As in the first example, when the contact unit 26 is at the second position, there may be a gap between the conductor 261 and the step portion 260*e*, and there may be a gap in the X2 direction between the electrical contact 150 and the end surface of the second protrusion 260*g* of the holding member 260. The shapes of the second protrusion 260*g* and the first protrusion 260*b* of the holding member 260 illustrated in FIGS. 11B and 11C, and the method of positioning the contact unit 26 with respect to the guide rail 231 are the same as those in the first example. FIG. 11D is a diagram illustrating a positional relationship between the contact unit 26 and the guide rail 231 in a state before the process cartridge 2 starts to be mounted to the apparatus body 1, and the contact unit 26 is at the first position.

The operation of the contact unit 26 in the process of mounting the process cartridge 2 is similar to that in the first example. In the conductor 261, the flange portion 261*a* operates similarly to the end 161*a* of the coil portion 161*c* of the contact spring 161 of the first example, and the distal end 261*b* operates similarly to the distal end 161*d* of the contact spring 161.

In a state after the mounting of the process cartridge 2 is started and before the pressing portion 151 of the process cartridge 2 contacts with and presses the first protrusion 260*b* of the holding member 260, the contact unit 26 is at the first position, and the flange portion 261*a* contacts with the step portion 260*e*.

When the process cartridge 2 advances in the Y1 direction and the pressing portion 151 presses the first protrusion 260*b* to push the contact unit 26 in the X1 direction, the contact unit 26 moves to the third position. At this time, the distal end 261*b* of the conductor 261 is retracted to a position not in contact with the process cartridge 2.

When the process cartridge 2 further advances in the Y1 direction and enters the mounted state, the first protrusion 260*b* does not contact with the process cartridge 2 in the recessed portion U, and the contact unit 26 moves to the second position. The second protrusion 260*g* of the holding member 260 and the electrical contact 150 of the process cartridge 2 do not contact with each other, the flange portion 261*a* and the step portion 260*e* do not contact with each other, and only the distal end 261*b* contacts with the electrical contact 150. The compression coil spring 262 applies a force in the X2 direction to the conductor 261, but when the contact unit 26 is at the second position, the conductor 261 contacts with the electrical contact 150 and does not contact with the holding member 260, so that the force of the compression coil spring 262 does not act on the holding member 260.

The conductor 261 is electrically connected to the circuit board of the apparatus body 1, and the distal end 261*b* of the conductor 261 and the electrical contact 150 are in contact with each other, whereby the process cartridge 2 and the apparatus body 1 are electrically connected. The electrical connection between the conductor 261 and the apparatus body 1 may be a form in which the conductor 261 and the circuit board of the apparatus body 1 are connected by, for example, a wiring member (not illustrated). Alternatively, the compression coil spring 262 may be made of a conductive material such as metal, and the compression coil spring 262, the conductor 261, and the circuit board may be electrically connected.

Third Example

A third example of the invention will be described. Portions that are the same as or correspond to those in the first and second examples are denoted with the same reference numerals, and a detailed description thereof will be omitted. In the second example, the compression coil spring is mounted to the contact, but in the third example, the contact and the compression coil spring are mounted in different portions of the holding member.

A contact unit 36 holding the contact on the apparatus body 1 side can move to the following positions according to the state of the process cartridge 2 in the mounting process.

Figure 12A:
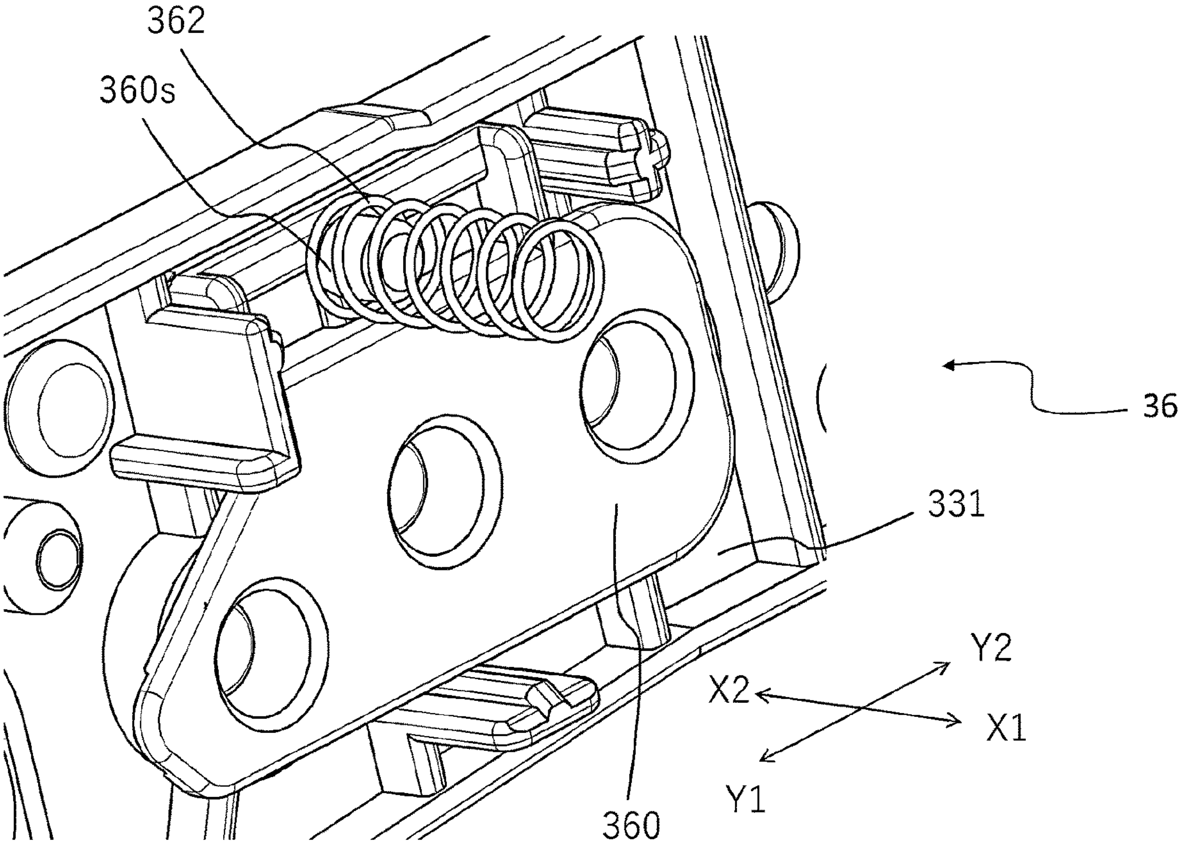
FIG. 12A is an external perspective view illustrating a guide rail and a contact unit of a third example.
Figure 12B:
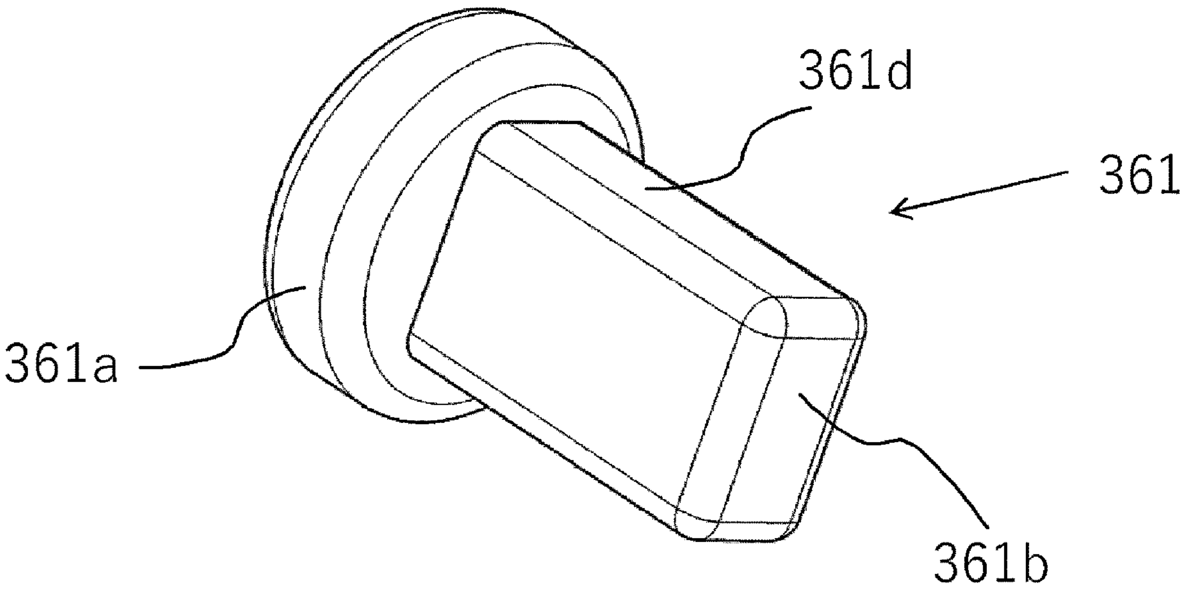
FIG. 12B is an external perspective view illustrating a conductor of the third example.
Figure 12C:
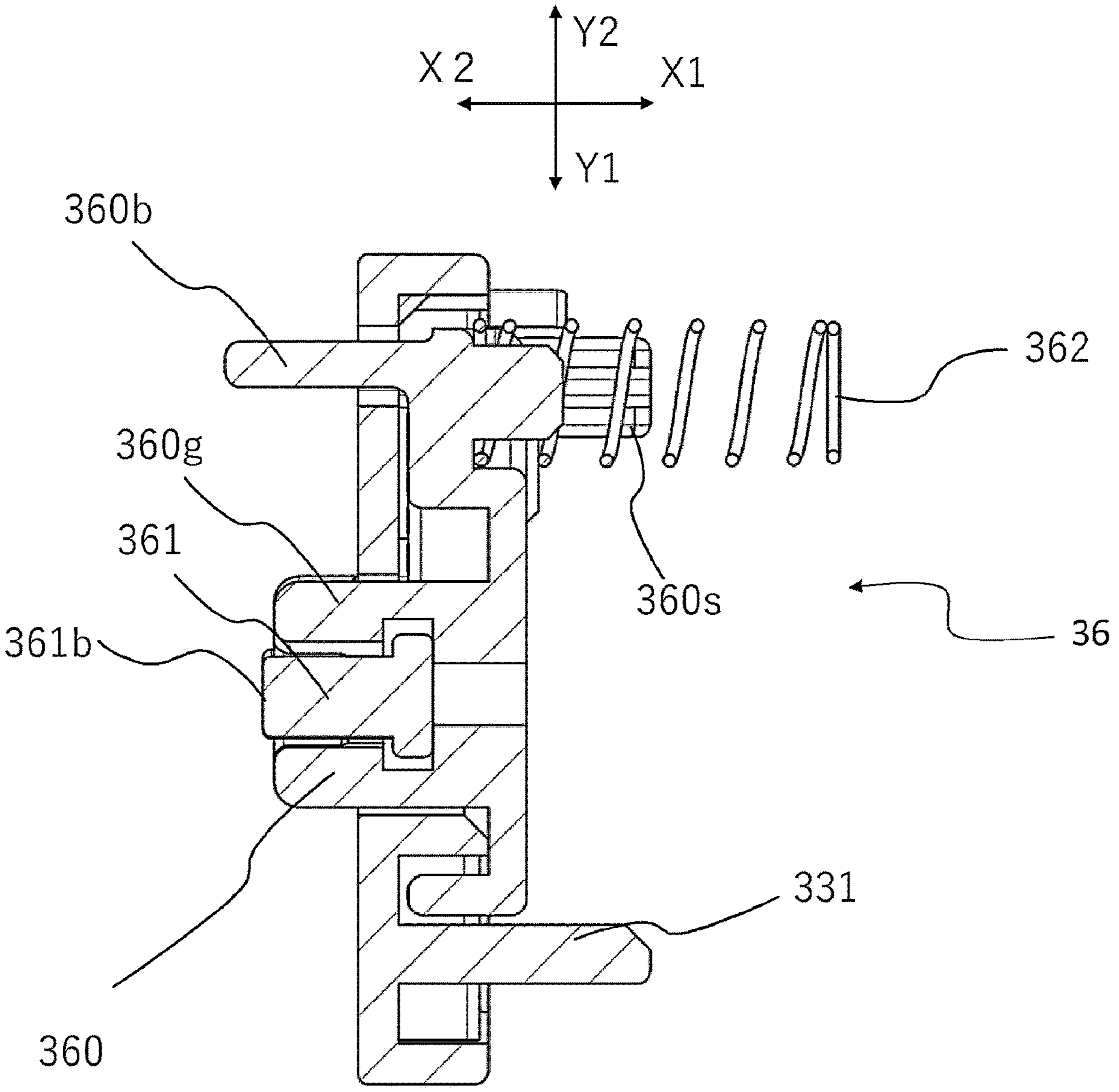
FIG. 12C is a cross-sectional view illustrating the guide rail and the contact unit of the third example.

First position: a position in a non-mounted state when the process cartridge 2 is not mounted to the apparatus body 1 (FIGS. 12A to 12C)

Second position: a position in a mounted state when the process cartridge 2 is mounted to the apparatus body 1

Third position: a position in a middle state when the process cartridge 2 transitions from the non-mounted state to the mounted state The contact unit 36 of the third example includes a compression coil spring 362, a conductor 361, and a holding member 360. FIG. 12A is a perspective view of the contact unit 36, FIG. 12B is a perspective view of the conductor 361, and FIG. 12C is a cross-sectional view of the contact unit 36, which corresponds to the cross-sectional view taken along line EE of FIG. 11C. FIG. 12C illustrates a state before the process cartridge 2 starts to be mounted to the apparatus body 1, and the contact unit 36 is at the first position. In these drawings, in order to facilitate understanding, a side plate of the apparatus body 1 provided with a guide rail 331 and a circuit board which is a connection destination of the contact of the apparatus body 1 on the apparatus body 1 side are not illustrated.

The second direction (X1 direction) of the compression coil spring 362 is the compression direction. The holding member 360 holds the conductor 361 and is movable in the second direction by compressing the compression coil spring 362. The holding member 360 is provided with a first protrusion 360*b* which is a protrusion pressed by the pressing portion 151 when the process cartridge 2 is in the middle state. The conductor 361 is exposed from the holding member 360 toward the mounting region. Details will be described below.

As illustrated in FIG. 12B, the conductor 361 of the third example has a shaft portion 361*d* and a flange portion 361*a*. As illustrated in FIG. 12C, the contact unit 36 is mounted to the guide rail 331. The holding member 360 has a first protrusion 360*b* and a second protrusion 360*g*, and the conductor 361 is mounted to the second protrusion 360*g* of the holding member 360 and connected to the circuit board of the apparatus body 1 by a conductive wire (not illustrated). A distal end 361*b* of the shaft portion 361*d* of the conductor 361 on the side opposite to the flange portion 361*a* contacts with the electrical contact 150 of the process cartridge 2, whereby the process cartridge 2 and the apparatus body 1 are electrically connected.

The holding member 360 is provided with a boss 360*s* protruding in the X1 direction, and the compression coil spring 362 for biasing the conductor 361 toward the electrical contact 150 in the X2 direction is mounted to the boss 360*s* of the holding member 360.

The operation of the holding member 360 in the process of mounting the process cartridge 2 is similar to that in the first and second examples.

In a state after the mounting of the process cartridge 2 is started and before the pressing portion 151 of the process cartridge 2 contacts with the first protrusion 360*b* of the holding member 360, the contact unit 36 is at the first position.

When the process cartridge 2 advances in the Y1 direction, the pressing portion 151 contacts with the first protrusion 360*b*, and the holding member 360 is pushed in the X1 direction, the contact unit 36 moves to the third position. At this time, the distal end 361*b* of the conductor 361 does not contact with the process cartridge 2.

When the process cartridge 2 further advances in the Y1 direction and enters the mounted state, the first protrusion 360*b* is inserted into the recessed portion U and does not contact with the end surface 152 of the process cartridge 2, and the contact unit 36 moves to the second position. The second protrusion 360*g* of the holding member 360 and the electrical contact 150 of the process cartridge 2 are not in contact with each other, and only the distal end 361*b* of the conductor 361 is in contact with the electrical contact 150. The compression coil spring 362 applies a force in the X2 direction to the holding member 360. Since the conductor 361 is fixed to the holding member 360, a force in the X2 direction by the compression coil spring 362 acts on the conductor 361 via the holding member 360.

The conductor 361 is electrically connected to the circuit board of the apparatus body 1, and the distal end 361*b* and the electrical contact 150 are in contact with each other, whereby the process cartridge 2 and the apparatus body 1 are electrically connected. The electrical connection between the conductor 361 and the apparatus body 1 may be a form in which the conductor 361 and the circuit board of the apparatus body 1 are connected by, for example, a wiring member (not illustrated). Alternatively, the compression coil spring 362 may be made of a conductive material such as metal, and the compression coil spring 362, the conductor 361, and the circuit board may be electrically connected.

Fourth Example

Next, a fourth example of the present invention will be described. Portions that are the same as or correspond to those in the first example are denoted with the same reference numerals, and a detailed description thereof will be omitted. In the first example, in the process of mounting the process cartridge 2, the pressing portion 151 of the process cartridge 2 contacts with and presses the first protrusion 160*b* of the holding member 160, so that the contact unit 16 moves from the first position to the third position. In the fourth example, in the process of mounting the process cartridge 2, the pressing portion 151 of the process cartridge 2 contacts with and presses a first protrusion 460*b* of a holding member 460 and a second protrusion 460*g*1 located most upstream in the Y1 direction among three second protrusions. The first protrusion 460*b* and the second protrusion 460*g*1 function as a plurality of protrusions. Accordingly, a contact unit 46 moves from the first position to the third position. The contact on the apparatus body 1 side is constituted by a contact spring 461 in the same manner as in the first example.

The holding member 460 holding the contact spring 461, which is the contact on the apparatus body 1 side, can move to the following positions according to the state of the process cartridge 2 in the mounting process.

First position: a position in a non-mounted state when the process cartridge 2 is not mounted to the apparatus body 1

Second position: a position in a mounted state when the process cartridge 2 is mounted to the apparatus body 1

Figure 13A:
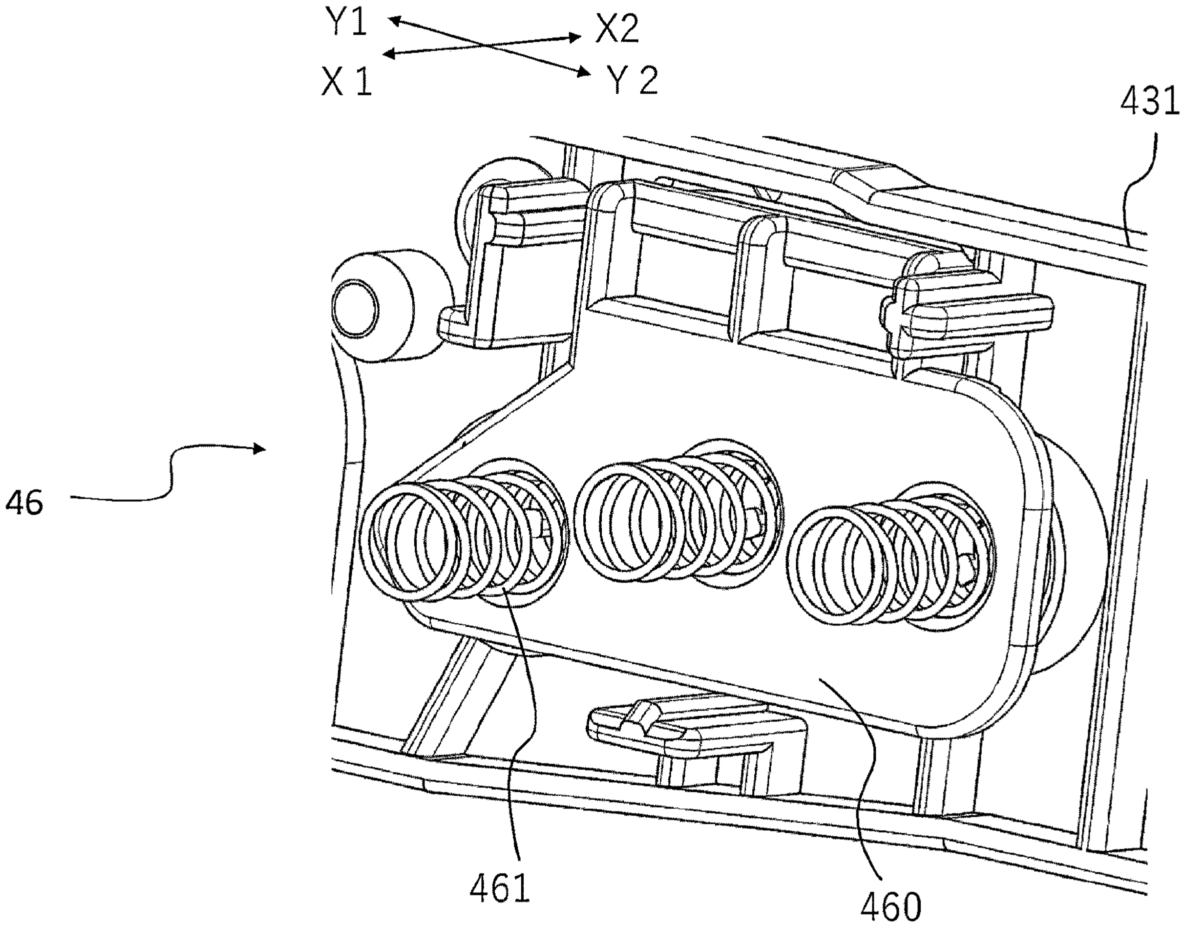
FIG. 13A is an external perspective view illustrating a guide rail and a contact unit of a fourth example.
Figure 13B:
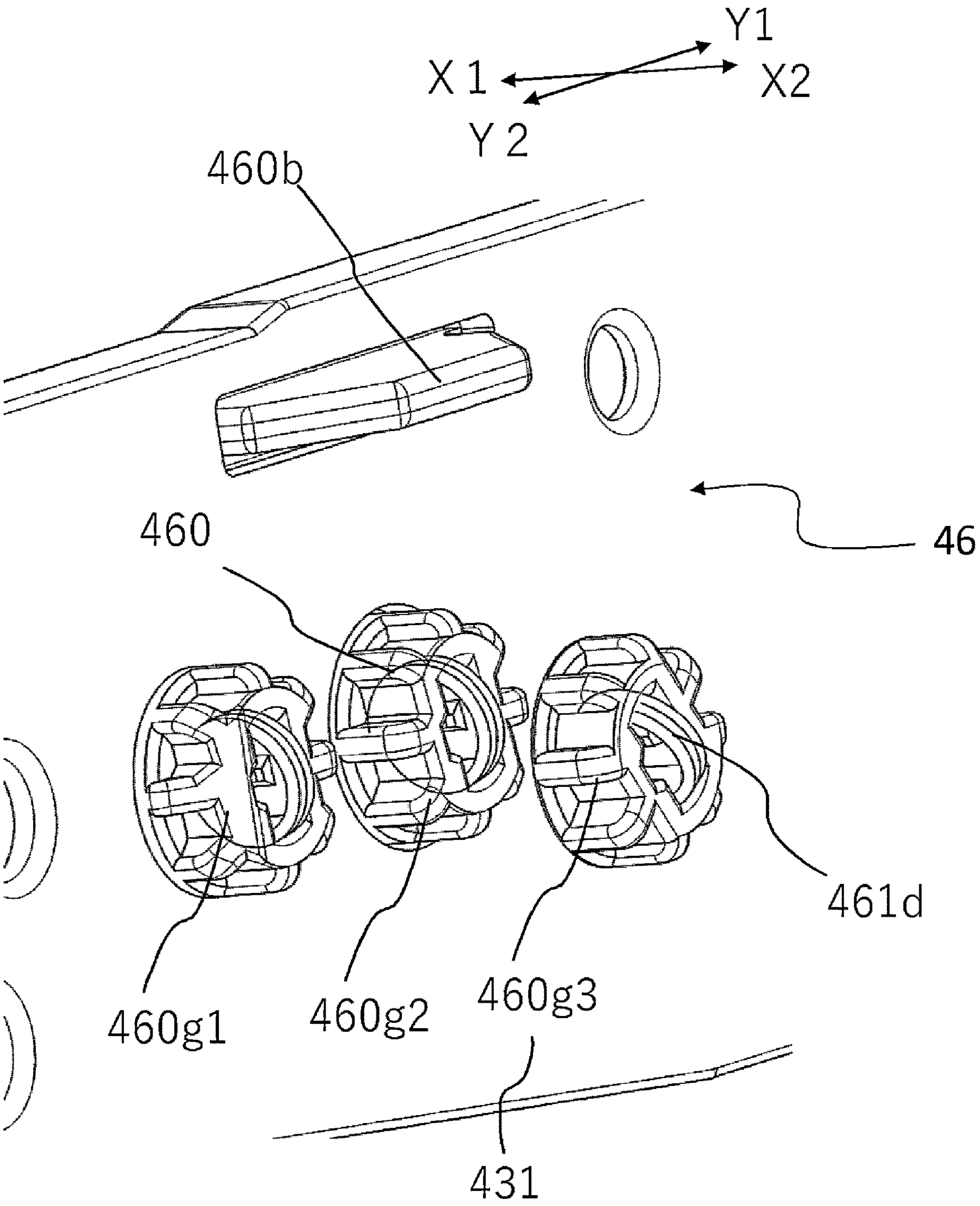
FIG. 13B is an external perspective view illustrating the guide rail and the contact unit of the fourth example.
Figure 13C:
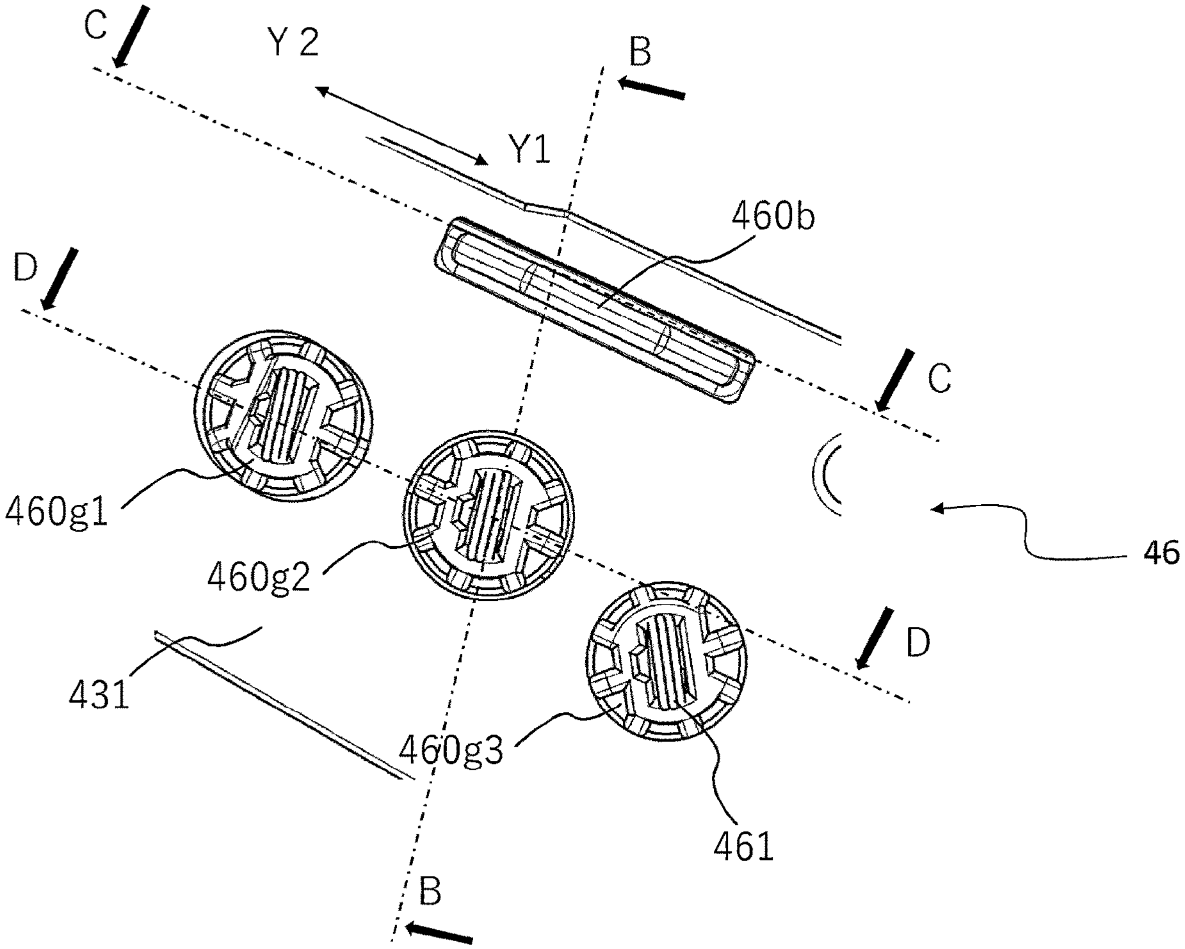
FIG. 13C is a front view illustrating the guide rail and the contact unit of the fourth example.
Figure 13D:
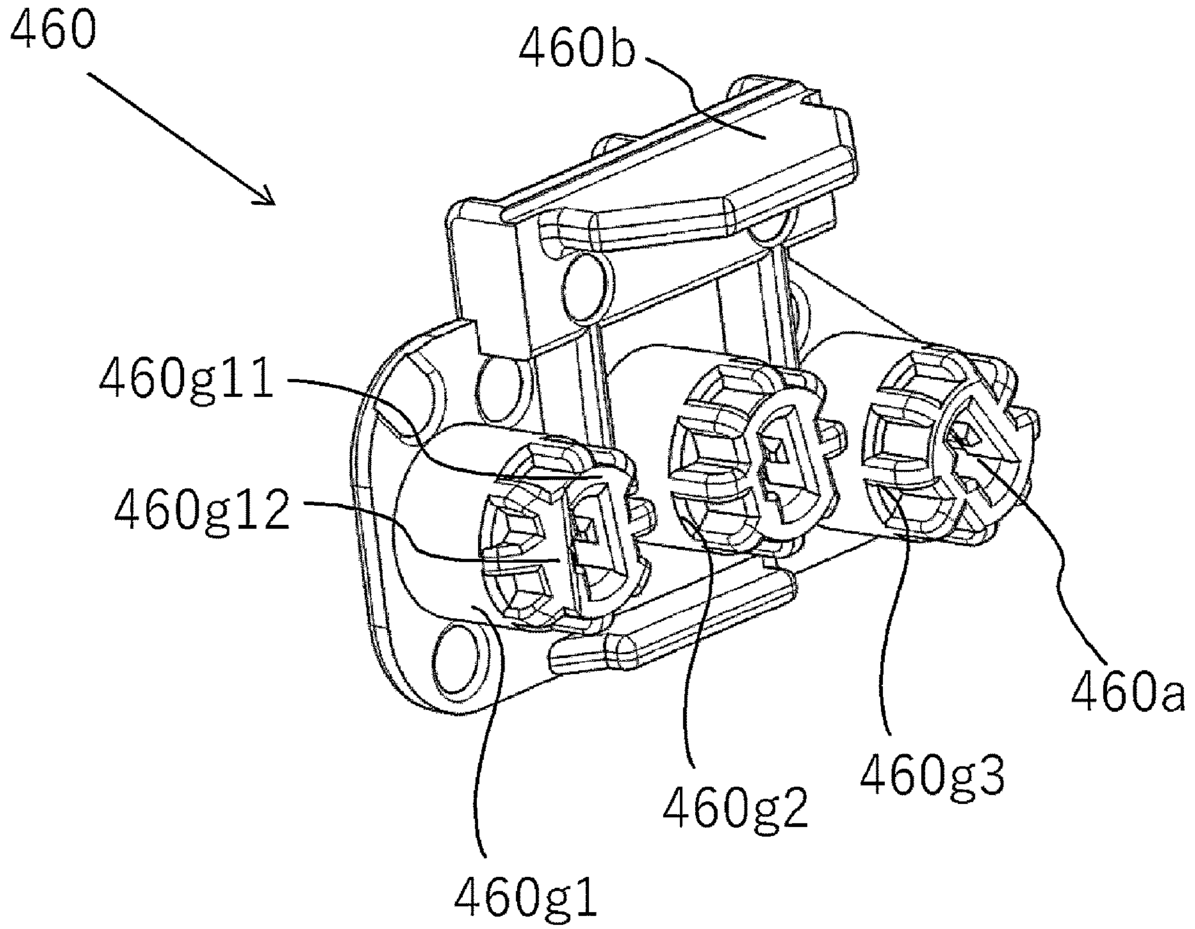
FIG. 13D is an external perspective view illustrating a holding member of the fourth example.

Third position: a position in a middle state when the process cartridge 2 transitions from the non-mounted state to the mounted state A configuration of the contact unit 46 will be described with reference to FIGS. 13A to 13D. FIG. 13A is an external perspective view of the contact unit 46, and FIGS. 13B and 13C are an external perspective view and a front view of the contact unit 46 as viewed from the side of the mounting region of the apparatus body 1. FIG. 13D is an external perspective view of the holding member 460. In these drawings, in order to facilitate understanding, a side plate of the apparatus body 1 provided with a guide rail 431 and a circuit board which is a connection destination of the contact of the apparatus body 1 on the apparatus body 1 side are not illustrated.

In FIGS. 13A to 13C, the configuration related to the mounting of the contact spring 461 to the holding member 460, the mounting of the contact unit 46 to the guide rail 431, and the positioning of the contact unit 46 and the guide rail 431 is similar to that of the first example. As illustrated in FIG. 13C, the holding member 460 includes a first protrusion 460*b* and three second protrusions. Of the three second protrusions, the one located most upstream in the Y1 direction and closest to the mounted process cartridge 2 is defined as a second protrusion 460*g*1, and the other two are defined as second protrusions 460*g*2 and 460*g*3 from the upstream side in the Y1 direction. The three second protrusions are provided with an opening 460*a*, and a distal end 461*d* of the contact spring 461 mounted to the second protrusion is exposed from the opening 460*a* toward the mounting region in the X2 direction.

Figure 14:
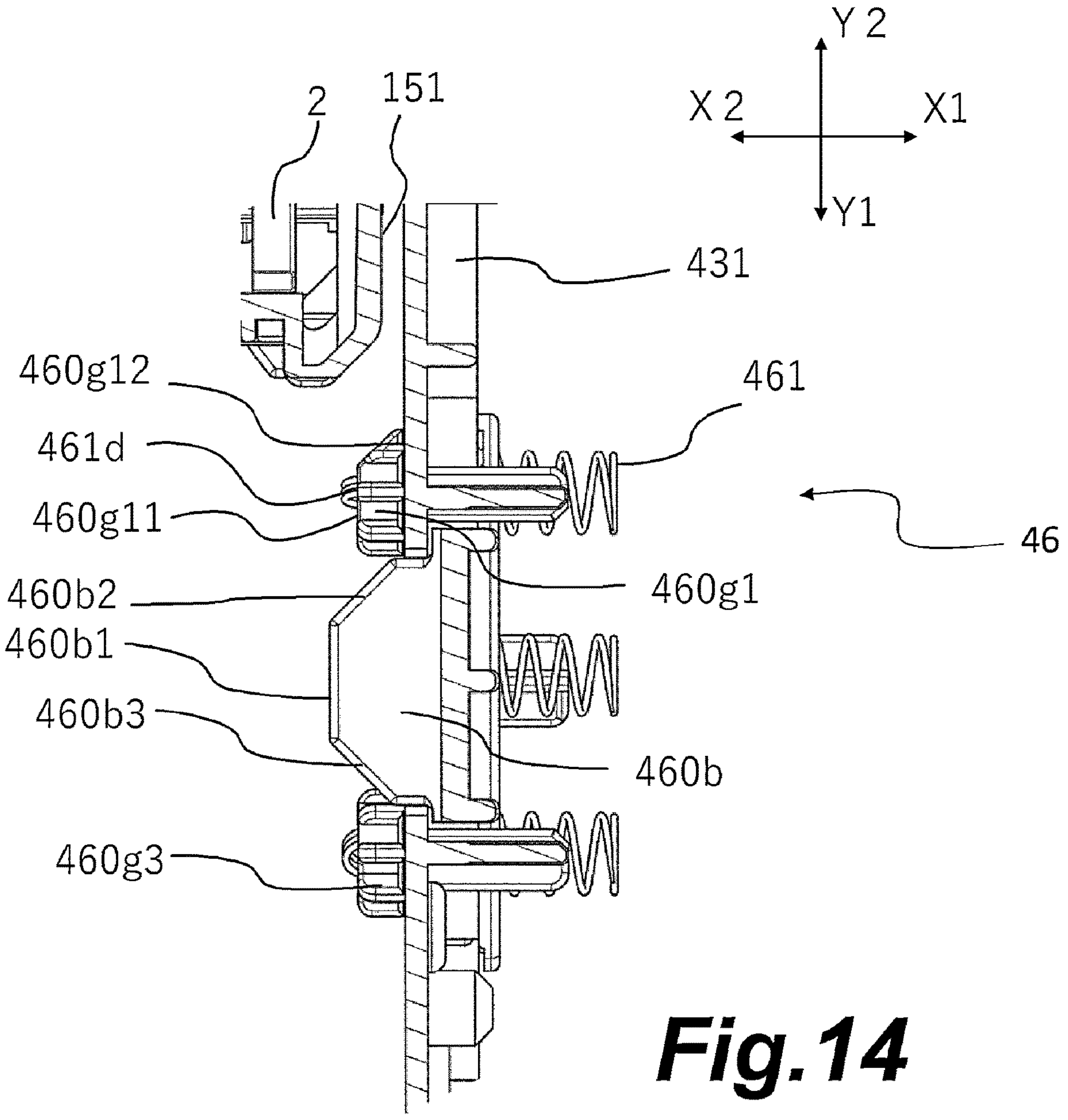
FIG. 14 is a cross-sectional view illustrating a first position of the contact unit of the fourth example.

The operation of the contact unit 46 in the process of mounting the process cartridge 2 will be described. FIG. 14 is a cross-sectional view taken along line CC in FIG. 13C, and illustrates a state after the process cartridge 2 starts to be mounted to the apparatus body 1 and before the process cartridge 2 reaches the contact unit 46. At this time, the contact unit 46 is at the first position.

Figure 15:
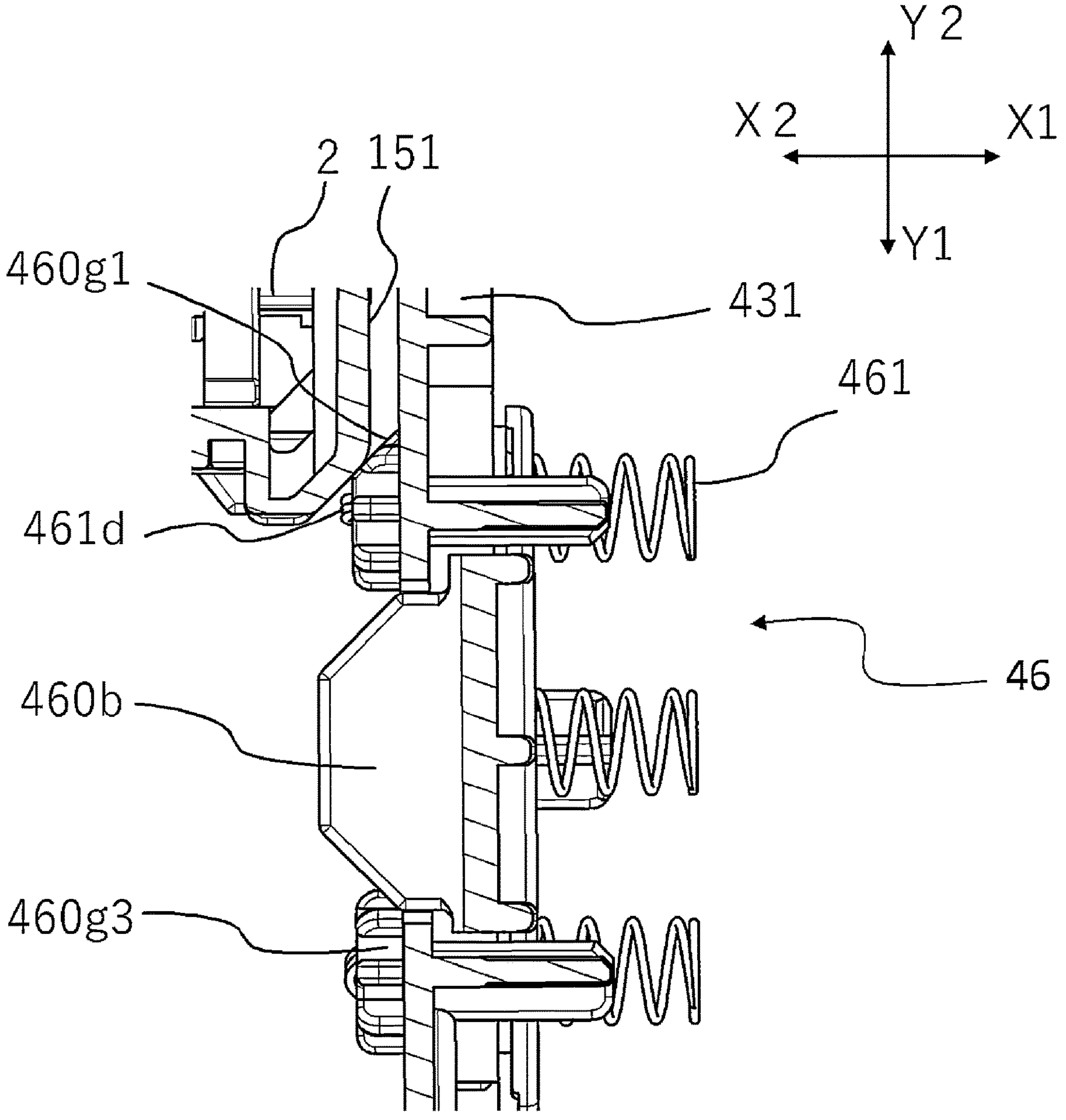
FIG. 15 is a cross-sectional view illustrating a third position of the contact unit of the fourth example.

FIG. 15 is a cross-sectional view taken along line CC in FIG. 13C, and illustrates a state in which the process cartridge 2 has reached the second protrusion 460*g*1 of the contact unit 46. When the process cartridge 2 advances in the Y1 direction from the position of FIG. 14, the process cartridge 2 contacts with the second protrusion 460*g*1 of the contact unit 46 as illustrated in FIG. 15. As illustrated in FIG. 14, the first protrusion 460*b* has a first surface 460*b*1, a second surface 460*b*2, and a third surface 460*b*3. The first surface 460*b*1 extends along the Y1 direction. The second surface 460*b*2 is an inclined surface extending obliquely in the X1 direction from the end of the first surface 460*b*1 in the Y2 direction, and the third surface 460*b*3 is an inclined surface extending obliquely in the X1 direction from the end of the first surface 460*b*1 in the Y1 direction. The second protrusion 460*g*1 has a first surface 460*g*11 and a second surface 460*g*12. The first surface 460*g*11 extends along the Y1 direction. The second surface 460*g*12 is an inclined surface extending obliquely in the X1 direction from the end of the first surface 460*g*11 in the Y2 direction.

When the pressing portion 151 of the process cartridge 2 contacts with the second protrusion 460*g*1 in the process of mounting the process cartridge 2, the pressing portion 151 contacts with the inclined surface of the second surface 460*g*12. Then, the second protrusion 460*g*1 is pressed in the X1 direction while sliding on the second surface 460*g*12, and the state of FIG. 15 is obtained. Therefore, when the state of FIG. 14 transitions to the state of FIG. 15, the resistance is small.

Figure 16:
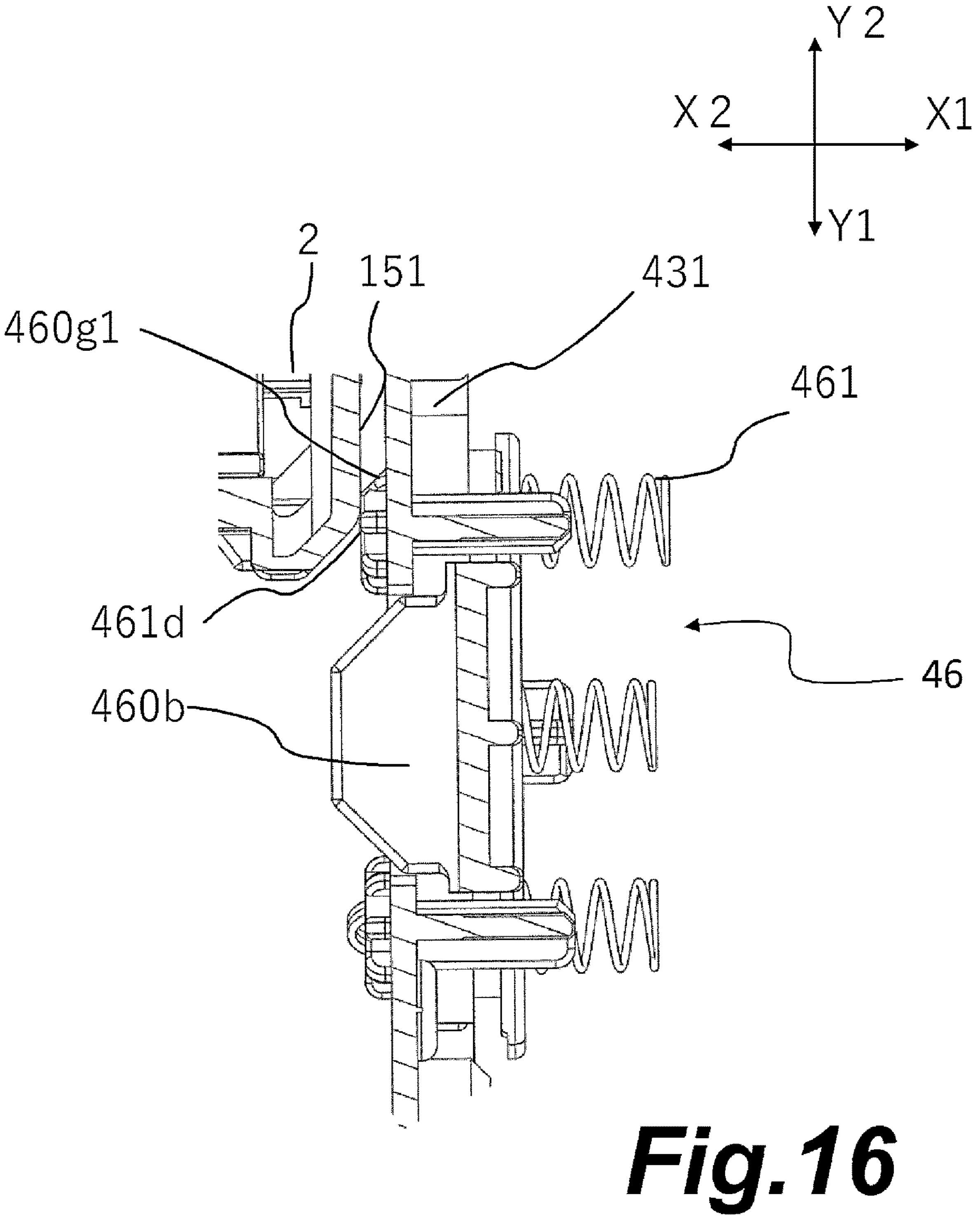
FIG. 16 is a cross-sectional view illustrating the third position of the contact unit of the fourth example.

FIG. 16 is a cross-sectional view taken along line CC in FIG. 13C. When the process cartridge 2 further advances in the Y1 direction from the state of FIG. 15, the pressing portion 151 of the process cartridge 2 gets over the second surface 460*g*12 of the second protrusion 460*g*1 and reaches the first surface 460*g*11. At this time, the distal end 461*d* of the contact spring 461 contacts with the process cartridge 2 and is pushed in the X1 direction.

Figure 17:
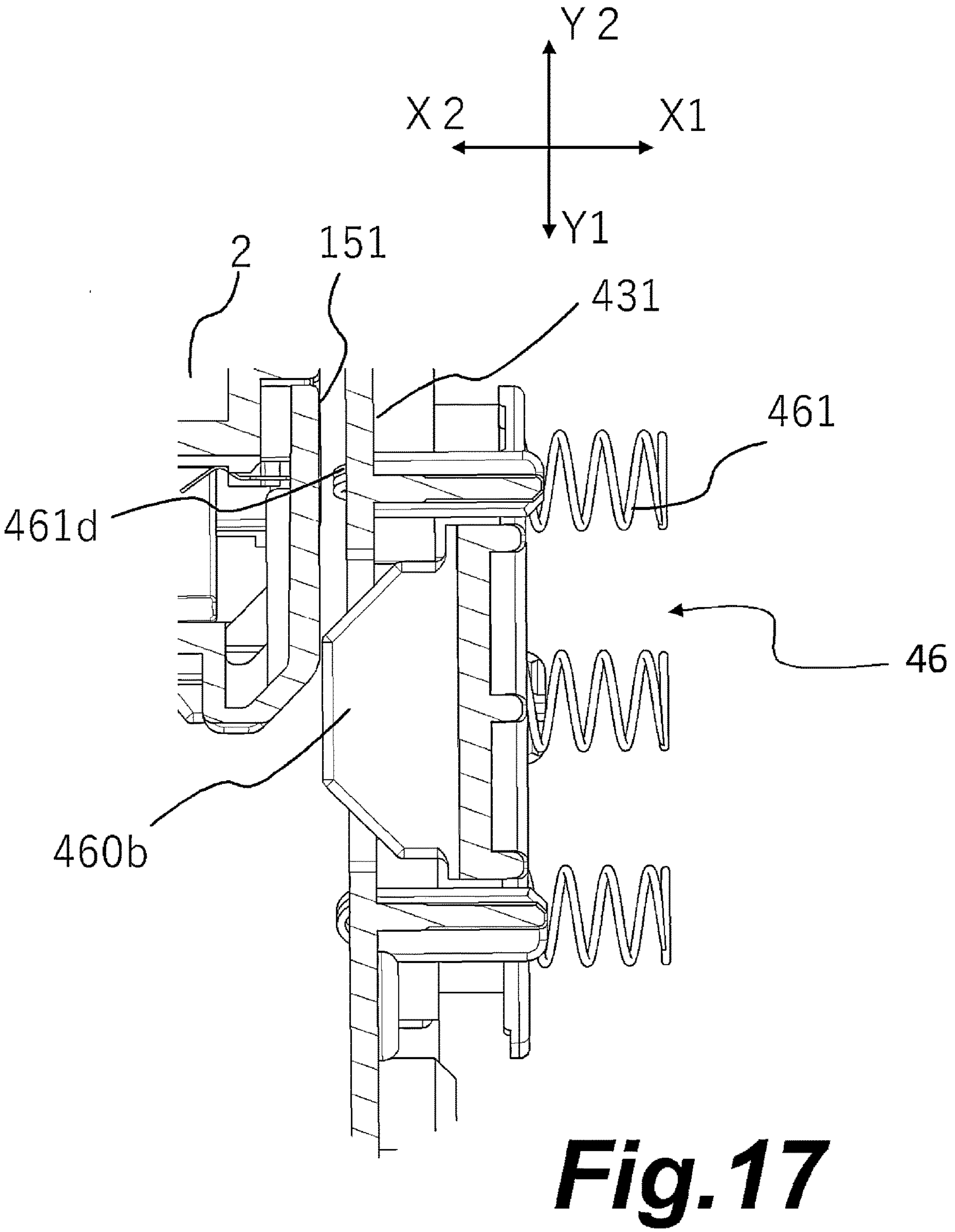
FIG. 17 is a cross-sectional view illustrating the third position of the contact unit of the fourth example.

FIG. 17 is a cross-sectional view taken along line CC in FIG. 13C, and illustrates a state in which the process cartridge 2 has reached the first protrusion 460*b* of the contact unit 46. When the process cartridge 2 further advances in the Y1 direction from the state of FIG. 16, the process cartridge 2 contacts with and presses the first protrusion 460*b* of the contact unit 46. The contact unit 46 is further pushed in the X1 direction from the position of FIG. 16 to the third position. The shape of the first protrusion 460*b* is similar to that of the first example, and when the process cartridge 2 contacts with the first protrusion 460*b* of the contact unit 46, the process cartridge 2 contacts with the inclined surface of the second surface 460*b*2. Then, the first protrusion 460*b* is pressed in the X1 direction while sliding on the second surface 460*b*2, and the state of FIG. 17 is obtained. Therefore, when the state of FIG. 16 transitions to the state of FIG. 17, the resistance is small. At this time, since the relationship between the second protrusion and the contact spring 461 is similar to that in the first example, the contact spring 461 also moves in the X1 direction at the same time as the holding member 460 moves in the X1 direction.

Thereafter, when the process cartridge 2 further advances in the Y1 direction and enters the mounted state, the contact unit 46 moves to the second position. This state is similar to that of the first example, and thus description thereof is omitted.

In the process of mounting the process cartridge 2, first, the pressing portion 151 of the process cartridge 2 contacts with and presses the second protrusion 460*g*1 of the contact unit 46. Thereafter, the pressing portion 151 contacts with and presses the first protrusion 460*b*, and the contact spring 461 retracts to a position not in contact with the process cartridge 2. Therefore, the mounting operation can be completed without the contact spring 461 of the contact unit 46 being caught by the process cartridge 2 in the middle of mounting, and the mounting operability is good. In addition, in the fourth example, the pressed portion of the contact unit 46 pressed by the pressing portion 151 of the process cartridge 2 in the process of mounting the process cartridge 2 is configured by two members of the first protrusion 460*b* and the second protrusion 460*g*1. Therefore, the length of the first protrusion 460*b* in the Y1 direction can be shortened. This makes it possible to reduce the recessed portion U necessary for insertion of the first protrusion 460*b* in the mounted state.

The configuration of the fourth example can also be applied to a configuration in which the conductor of the second example and the compression coil spring are separated from each other, and the compression coil spring is mounted to the conductor, and a configuration in which the conductor of the third example and the compression coil spring are mounted in different places of the holding member.

Fifth Example

A fifth example of the present invention will be described. Portions that are the same as or correspond to those in the first example are denoted with the same reference numerals, and a detailed description thereof will be omitted. In each of the above examples, when the process cartridge 2 is in the non-mounted state, the end of the contact of the contact unit on the side of the mounting region is located farther from the mounting region than the end of the protrusion on the side of the mounting region in the second direction (X1 and X2 directions). For example, in FIG. 7, the position D2 of the distal end 161*d* of the contact spring 161 is farther from the mounting region T than the position D1 of the first surface 160*b*1 that is the end of the first protrusion 160*b*. On the other hand, in the fifth example, when the process cartridge 2 is in the non-mounted state, the end of the contact of the contact unit on the side of the mounting region of the contact is located closer to the mounting region than the end of the protrusion on the side of the mounting region in the second direction.

Figure 18A:
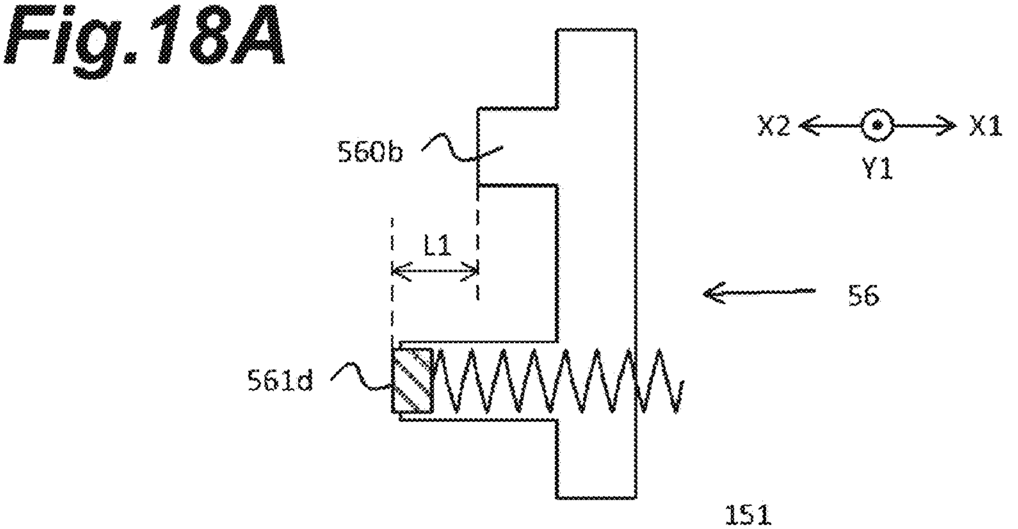
FIGS. 18A to 18C are cross-sectional views illustrating a first position, a second position, and a third position of the contact unit of a fifth example.
Figure 18B:
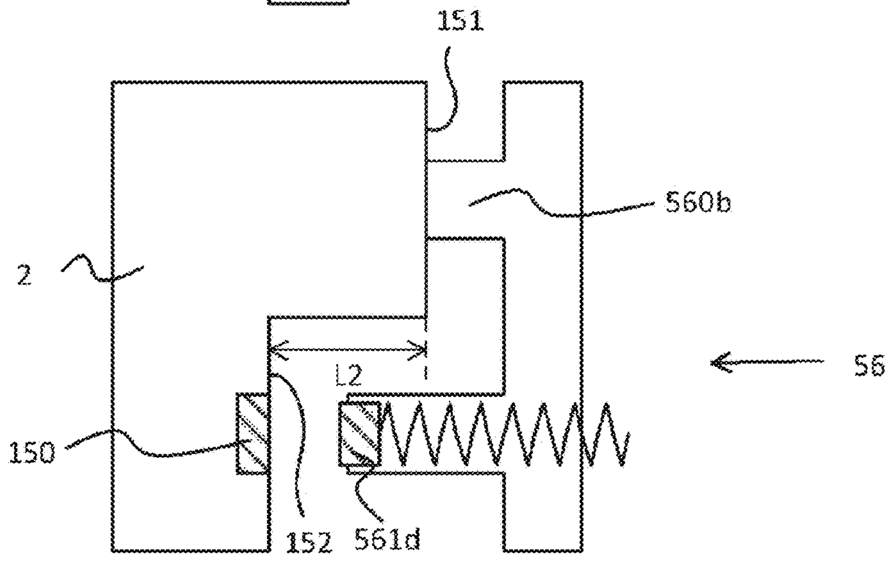
Figure 18C:
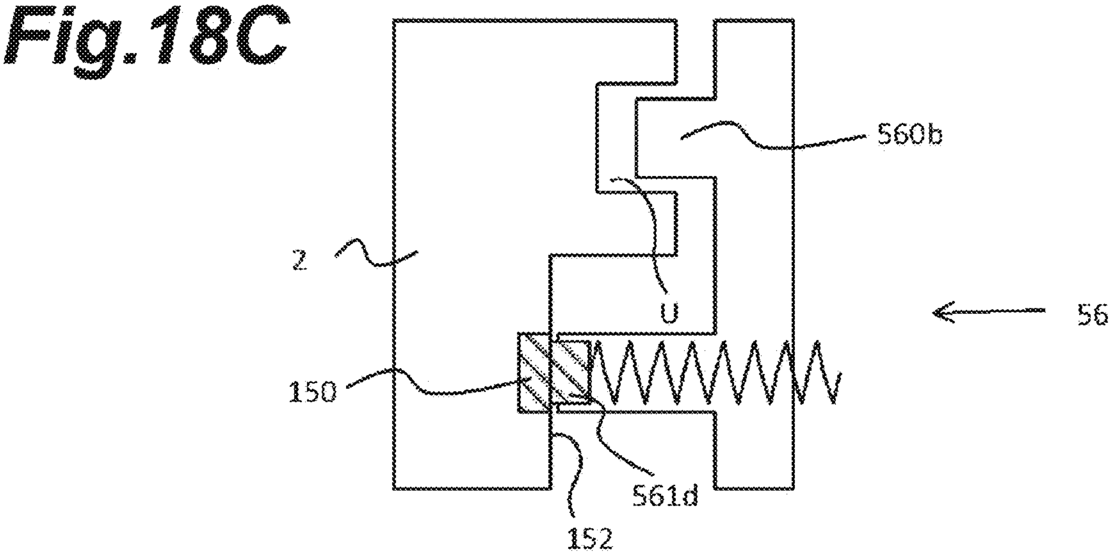

FIGS. 18A to 18C are diagrams illustrating a positional relationship between the contact unit 56 and the process cartridge 2 of the fifth example, and correspond to the cross-sectional view taken along line BB of FIG. 6E. FIG. 18A illustrates a state in which the process cartridge 2 is in the non-mounted state and the contact unit 56 is at the first position. FIG. 18B illustrates a state in which the process cartridge 2 is in the middle state and the contact unit 56 is at the third position. FIG. 18C illustrates a state in which the process cartridge 2 is in the mounted state and the contact unit 56 is at the second position.

As illustrated in FIG. 18A, when the process cartridge 2 is in the non-mounted state, the end of a contact 561*d* of the contact unit 56 on the side of the mounting region is located closer to the mounting region than the end of a first protrusion 560*b* on the side of the mounting region in the second direction (X1, X2). Other configurations are the same as those of the contact unit 16 of the first example. The distance in the second direction between the end of the contact 561*d* of the contact unit 56 on the side of the mounting region and the end of the first protrusion 560*b* on the side of the mounting region is defined as a distance L1.

As illustrated in FIG. 18B, when the process cartridge 2 is in the middle state of transitioning from the non-mounted state to the mounted state, the pressing portion 151 of the process cartridge 2 presses the first protrusion 560*b* of the contact unit 56 in the X1 direction. Accordingly, the contact unit 56 moves from the first position to the third position away from the mounting region. The distance L2 in the second direction between the end surface 152 and the pressing portion 151 in the second direction of the process cartridge 2 is set. As illustrated in FIGS. 18A and 18B, if L2>L1, when the contact unit 56 is at the third position in the middle state, the contact 561*d* retracts to a position where the end surface 152 or the electrical contact 150 does not contact. Therefore, it is possible to prevent the contact 561*d* of the contact unit 56 and the process cartridge 2 from interfering with each other and being caught when the process cartridge 2 is in the middle state.

As illustrated in FIG. 18C, when the process cartridge 2 is in the mounted state, the first protrusion 560*b* of the contact unit 56 is inserted into the recessed portion U provided on the end surface 152 of the process cartridge 2, and the electrical contact 150 and the contact 561*d* contact with each other. Accordingly, the contact unit 56 moves to the second position closer to the mounting region than the third position.

As described above, even with the configuration of the fifth example, the mounting operation can be completed without the contact 561*d* of the contact unit 56 coming into contact with and being caught by the process cartridge 2 being mounted, and the operability of attachment is good.

In each of the above examples, the present invention has been exemplified with an application of the process cartridge, but the cartridge to which the present invention can be applied is not limited to the process cartridge. The present invention can be applied to various cartridges having a powered member that receives power supply from the apparatus body and detachable from the apparatus body. In each of the above examples, the gap formed by the difference in the shapes of the end surfaces in the X1 direction of the first unit (cleaning unit 10) and the second unit (developing unit 20) constituting the cartridge is used as the recessed portion U. The recessed portion U may be formed by forming the end surfaces of the first unit and the second unit in the X1 direction to be flush with the pressing portion, and forming the end surface of the first unit, the end surface of the second unit, or the end surface of the first unit and the end surface of the second unit to be recessed in the X2 direction from the pressing portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-106824, filed on Jun. 29, 2023, which is hereby incorporated by reference herein in its entirety.

What is claimed is:

1. An image forming apparatus comprising:

a cartridge; and an apparatus body to which the cartridge is detachably mounted in a first direction, wherein the cartridge includes:

a pressing portion provided on an end surface in a second direction intersecting the first direction and a gravity direction;

a recessed portion provided in the end surface and recessed more than the pressing portion;

a powered member; and an electrical contact for receiving power to be supplied to the powered member, wherein the apparatus body includes:

a frame body having a mounting region where the cartridge is mounted; and a contact unit provided in an end of the frame body in the second direction, the contact unit including a contact and a protrusion protruding toward the mounting region, the contact and the protrusion being movable in the second direction and in a direction away from the mounting region against an elastic force, and the contact unit is located at:

a first position in a non-mounted state in which the cartridge is not mounted to the apparatus body;

a second position in a mounted state in which the cartridge is mounted to the apparatus body and is in the mounting region of the frame body, the second position being farther away from the mounting region than the first position in the second direction by the protrusion being inserted into the recessed portion and the contact contacting with the electrical contact; and a third position in a middle state of transitioning of the cartridge from the non-mounted state to the mounted state, the third position being farther away from the mounting region than the second position in the second direction by the protrusion being pressed by the pressing portion of the cartridge so that the contact does not contact with the cartridge.

2. The image forming apparatus according to claim 1, wherein the contact unit includes:

a contact spring having a compression coil spring of which a compression direction is the second direction and of which a distal end on a side of the mounting region is the contact; and a holding member that holds the contact spring and is movable in the second direction by the contact spring being compressed, the holding member being provided with the protrusion, and the distal end of the contact spring is exposed from the holding member toward the mounting region.

3. The image forming apparatus according to claim 2, wherein the holding member has a through hole penetrating in the second direction, and the distal end of the contact spring is exposed toward the mounting region through the through hole.

4. The image forming apparatus according to claim 3, wherein when the contact unit is at the second position, a gap is formed between the contact spring and the holding member in the second direction, and a gap is formed between the holding member and the electrical contact in the second direction.

5. The image forming apparatus according to claim 1, wherein the contact unit includes:

a compression coil spring of which a compression direction is the second direction;

a conductor provided in an end of the compression coil spring on a side of the mounting region; and a holding member that holds the conductor and is movable in the second direction by the compression coil spring being compressed, the holding member being provided with the protrusion, and the conductor is exposed from the holding member toward the mounting region.

6. The image forming apparatus according to claim 5, wherein the holding member has a through hole penetrating in the second direction, and an end of the conductor on a side of the mounting region is exposed toward the mounting region through the through hole.

7. The image forming apparatus according to claim 6, wherein when the contact unit is at the second position, a gap is formed between the conductor and the holding member in the second direction, and a gap is formed between the holding member and the electrical contact in the second direction.

8. The image forming apparatus according to claim 1, wherein the contact unit includes:

a compression coil spring of which a compression direction is the second direction;

a conductor; and a holding member that holds the conductor and is movable in the second direction by the compression coil spring being compressed, the holding member being provided with the protrusion, and the conductor is exposed from the holding member toward the mounting region.

9. The image forming apparatus according to claim 1, wherein in the non-mounted state, an end of the contact on a side of the mounting region is located farther from the mounting region than an end of the protrusion on a side of the mounting region in the second direction.

10. The image forming apparatus according to claim 1, wherein in the non-mounted state, an end of the contact on a side of the mounting region is located closer to the mounting region than an end of the protrusion on a side of the mounting region in the second direction.

11. The image forming apparatus according to claim 1, wherein the cartridge has a configuration in which a first unit and a second unit are connected, and the recessed portion is a gap formed by a difference between a shape of an end surface of the first unit in the second direction and a shape of an end surface of the second unit in the second direction.

12. The image forming apparatus according to claim 1, wherein the apparatus body includes a restricting member that is in contact with the contact unit in the second direction and restricts movement of the contact unit, and the contact unit includes a contacted portion configured to contact with the restricting member, and the contact unit moves to the first position by the contacted portion contacting with the restricting member.

13. The image forming apparatus according to claim 1, wherein the protrusion is one of a plurality of protrusions, and the contact unit includes the plurality of protrusions.

14. The image forming apparatus according to claim 1, wherein the apparatus body includes a guide rail extending in the first direction for guiding the cartridge, and the contact unit is provided in the guide rail so that the contact unit is movable in the second direction.

15. The image forming apparatus according to claim 14, wherein the guide rail has a hole through which the contact and the protrusion of the contact unit can pass, the hole positioning the contact unit by the contact and the protrusion passing through the hole.

16. The image forming apparatus according to claim 14, wherein the protrusion is one of a plurality of protrusions, and the contact unit includes the plurality of protrusions, the guide rail has a plurality of holes through which the plurality of protrusions can pass, a first hole among the plurality of holes that is located most upstream in the first direction is a long hole longer than a length in the first direction of the protrusion corresponding to the first hole, and a second hole among the plurality of holes that is located most downstream in the first direction is a hole to be fitted with the protrusion corresponding to the second hole.

17. The image forming apparatus according to claim 1, wherein the cartridge has a configuration in which a first unit and a second unit are swingably connected, the second unit is swingable when the cartridge is in the mounted state, the electrical contact is provided in the second unit, and a shape obtained by projecting a distal end of the contact, the distal end being in contact with the electrical contact, onto the electrical contact in the second direction is parallel to a tangential direction of a direction of swing.

* * * * *